United States Patent
Hasebe et al.

(10) Patent No.: US 7,272,720 B2
(45) Date of Patent: Sep. 18, 2007

(54) DATE-AND-TIME MANAGEMENT DEVICE AND SIGNATURE GENERATION APPARATUS WITH DATE-AND-TIME MANAGEMENT FUNCTION

(75) Inventors: Takayuki Hasebe, Kawasaki (JP); Seigo Kotani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 726 days.

(21) Appl. No.: 09/805,156

(22) Filed: Mar. 14, 2001

(65) Prior Publication Data

US 2002/0038231 A1   Mar. 28, 2002

(30) Foreign Application Priority Data

Sep. 27, 2000  (JP) .............................. 2000-293366

(51) Int. Cl.
- *H04L 9/00* (2006.01)
- *G06F 17/30* (2006.01)
- *G06F 7/04* (2006.01)
- *G06K 9/00* (2006.01)
- *G06F 15/16* (2006.01)

(52) U.S. Cl. ...................... 713/178; 713/181; 713/170; 726/30; 726/28; 709/248

(58) Field of Classification Search ................ 709/248; 713/179, 178, 181, 155, 170; 726/30, 28
See application file for complete search history.

(56) References Cited

U.S. PATENT DOCUMENTS

| | | | | | |
|---|---|---|---|---|---|
| 5,444,780 A | * | 8/1995 | Hartman, Jr. | ................ | 380/30 |
| 5,535,217 A | * | 7/1996 | Cheung et al. | ............. | 709/248 |
| 5,717,955 A | * | 2/1998 | Swinehart | ..................... | 710/62 |
| 5,907,685 A | * | 5/1999 | Douceur | ..................... | 709/248 |
| 5,968,133 A | * | 10/1999 | Latham et al. | .............. | 709/248 |
| 6,009,518 A | * | 12/1999 | Shiakallis | ....................... | 713/1 |
| 6,023,769 A | * | 2/2000 | Gonzalez | .................... | 713/400 |
| 6,157,957 A | * | 12/2000 | Berthaud | .................... | 709/248 |

(Continued)

FOREIGN PATENT DOCUMENTS

JP    63-259787    10/1988

(Continued)

OTHER PUBLICATIONS

Cisco. "System Time Management" (from Catalyst 2900 XL and Catalyst 3500 XL Switch, Rel. 12.0(5) XU documentation), Apr. 2000, <http://www.cisco.com/univercd/cc/td/doc/product/lan/c2900xl/29_35xu/>.*

(Continued)

*Primary Examiner*—Kambiz Zand
*Assistant Examiner*—Michael J Simitoski
(74) *Attorney, Agent, or Firm*—Staas & Halsey LLP

(57) ABSTRACT

Before accepting a setting request from a predetermined manager in a plurality of date-and-time managers capable of issuing a date-and-time setting request, a setting request from any manager can be accepted. After accepting a setting request from a predetermined manager, only the setting request from the predetermined manager can be accepted. A date and time can be set in response to an accepted date-and-time setting request.

31 Claims, 21 Drawing Sheets

U.S. PATENT DOCUMENTS

| | | | |
|---|---|---|---|
| 6,199,169 B1* | 3/2001 | Voth | 713/400 |
| 6,507,910 B2* | 1/2003 | Kotani | 713/182 |
| 6,581,110 B1* | 6/2003 | Harif et al. | 709/248 |
| 6,618,455 B1* | 9/2003 | Maeda et al. | 375/354 |
| 6,725,278 B1* | 4/2004 | Gonzalez | 709/248 |
| 6,742,048 B1* | 5/2004 | Walsh | 709/248 |

FOREIGN PATENT DOCUMENTS

| | | |
|---|---|---|
| JP | 2-109111 | 4/1990 |
| JP | 7-36559 | 2/1995 |
| JP | 2000-215167 | 8/2000 |

OTHER PUBLICATIONS

LinuxGuruz. "FOLDOC: Free On-Line Dictionary of Computing", §Non-volatile Storage, May 2002.*

Menezes, Alfred J. et al. Handbook of Applied Cryptography, 1997 CRC Press, pp. 397-400, 500-507 & 568-583.*

Mills, David L. "Internet Time Synchronization: The Network Time Protocol", Oct. 1991, IEEE Transactions on Communications, vol. 39, No. 10, pp. 1482-1493.*

Microsoft Press. Microsoft Windows NT 4.0 Security, Audit, and Control, 1999 PricewaterhouseCoopers, pp. 92-140 & 278-303.*

Notice of Rejection Grounds for Japanese Application No. 2001-269106, mailed Mar. 28, 2006.

* cited by examiner

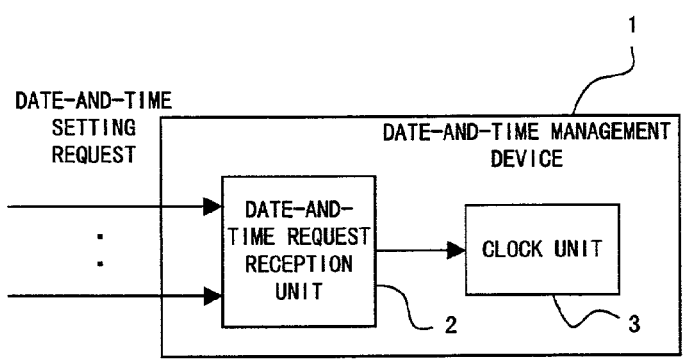
F I G. 1 A
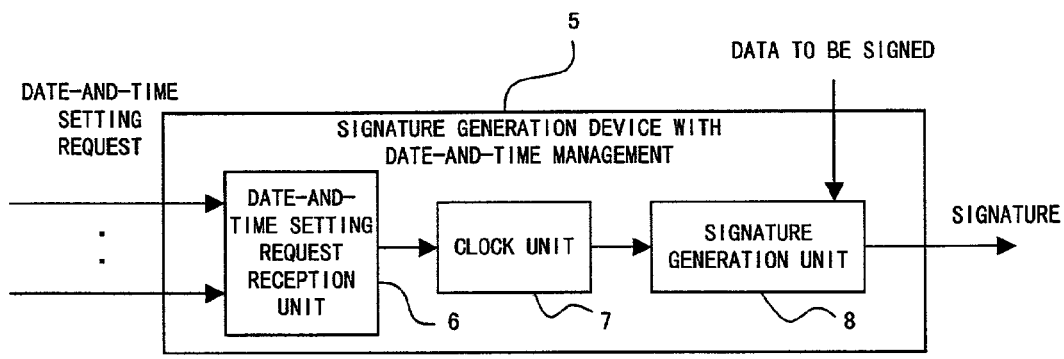
F I G. 1 B

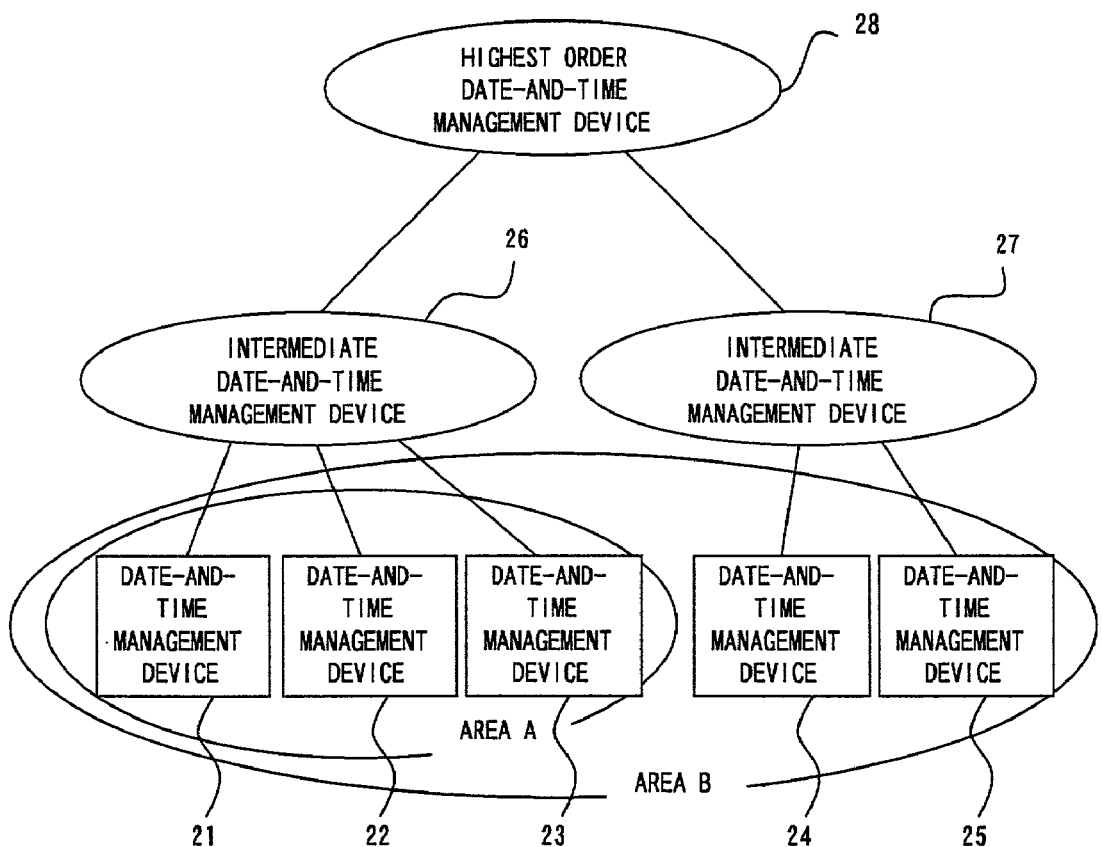
F I G. 3

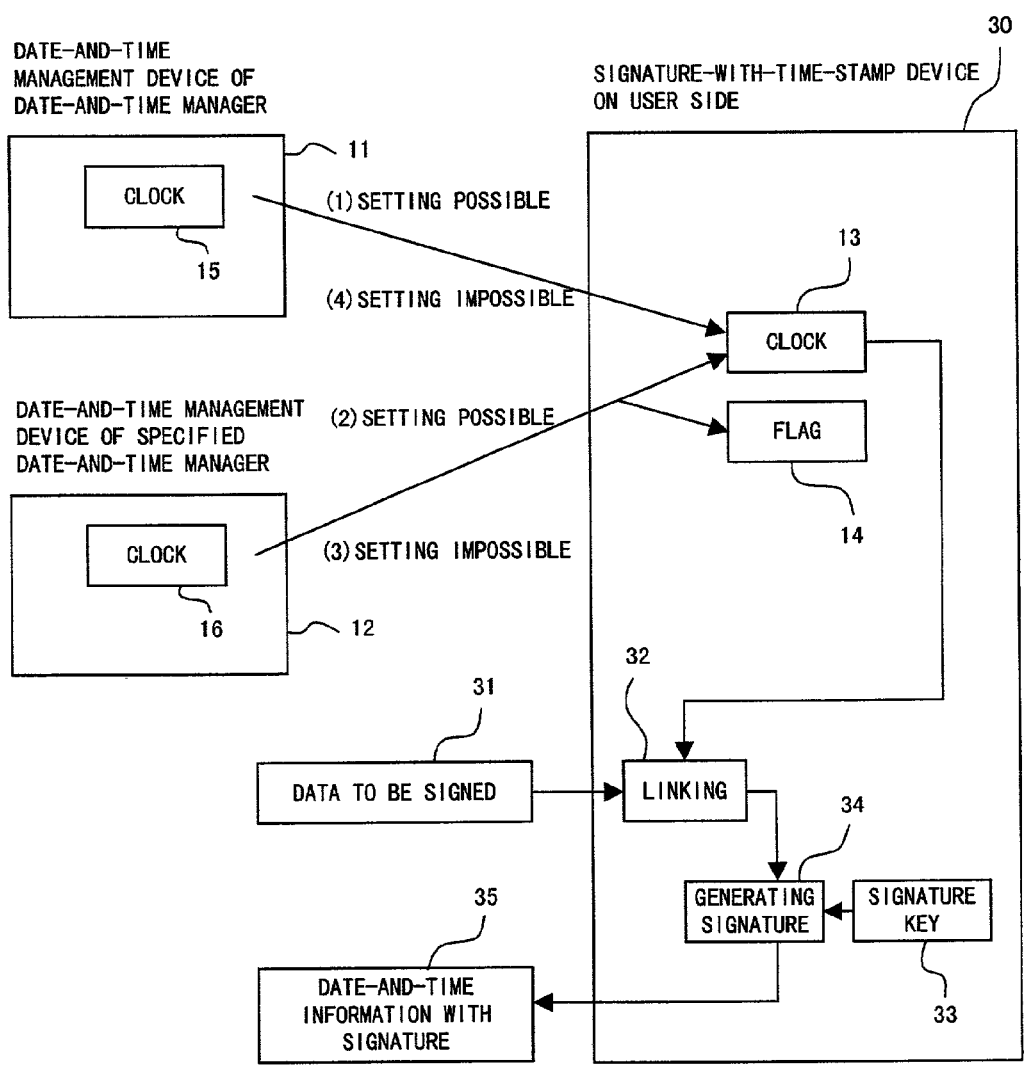
F I G. 4

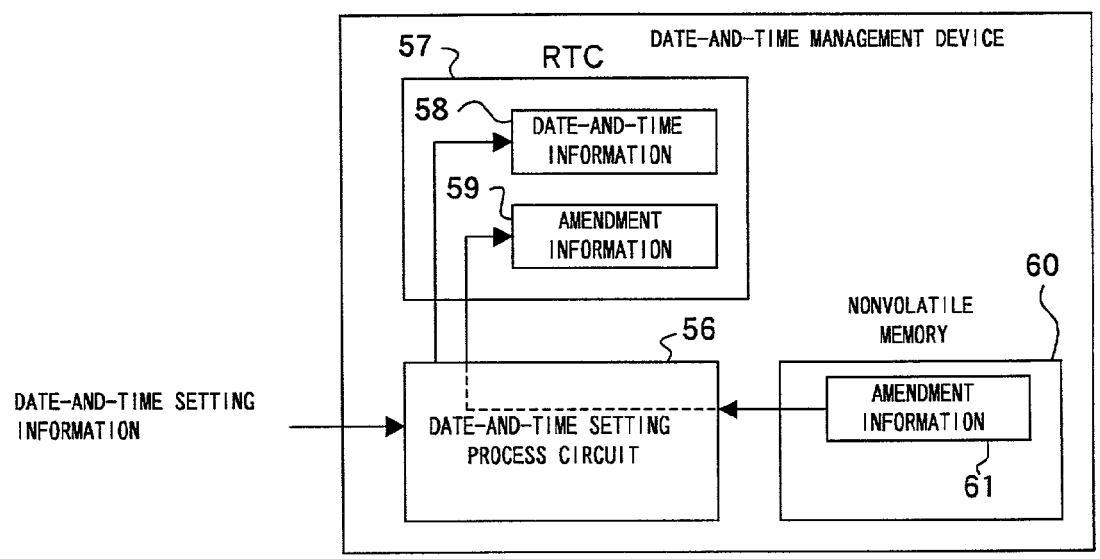
F I G. 1 1

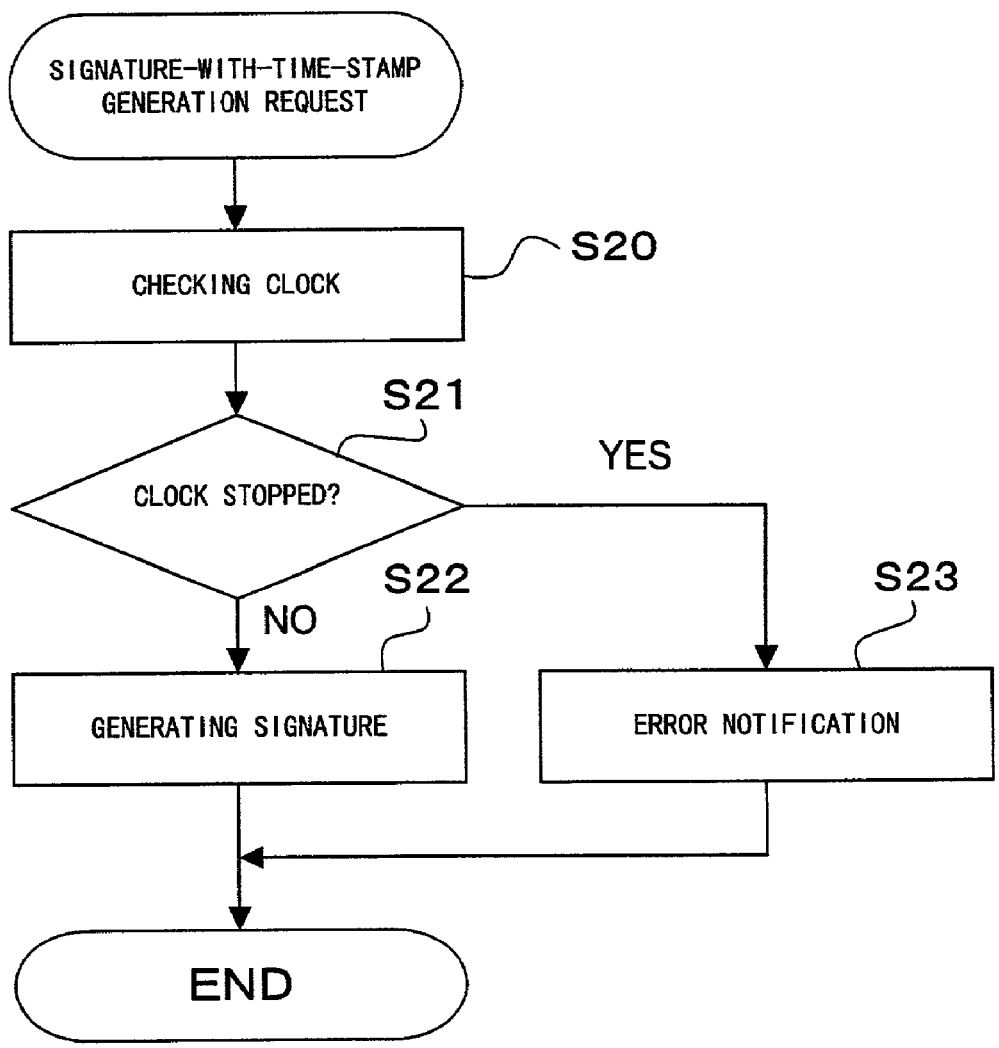
F I G. 1 2

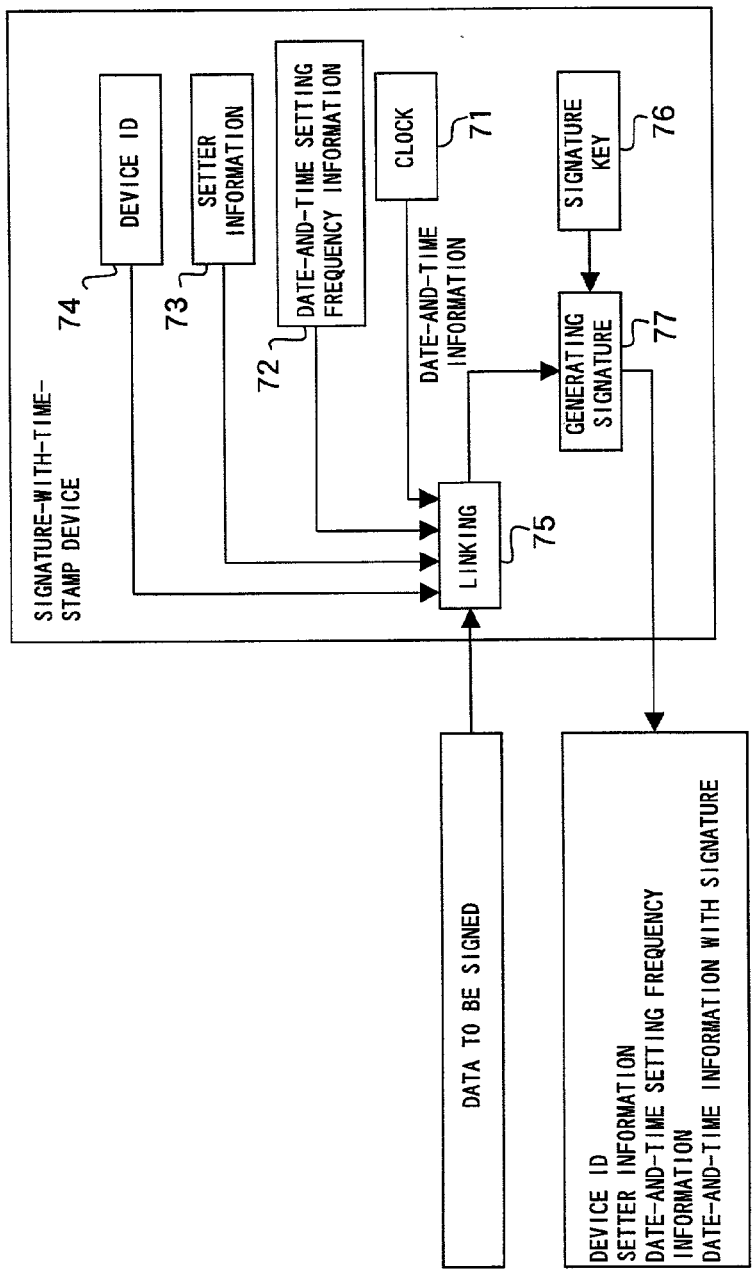
F I G. 14

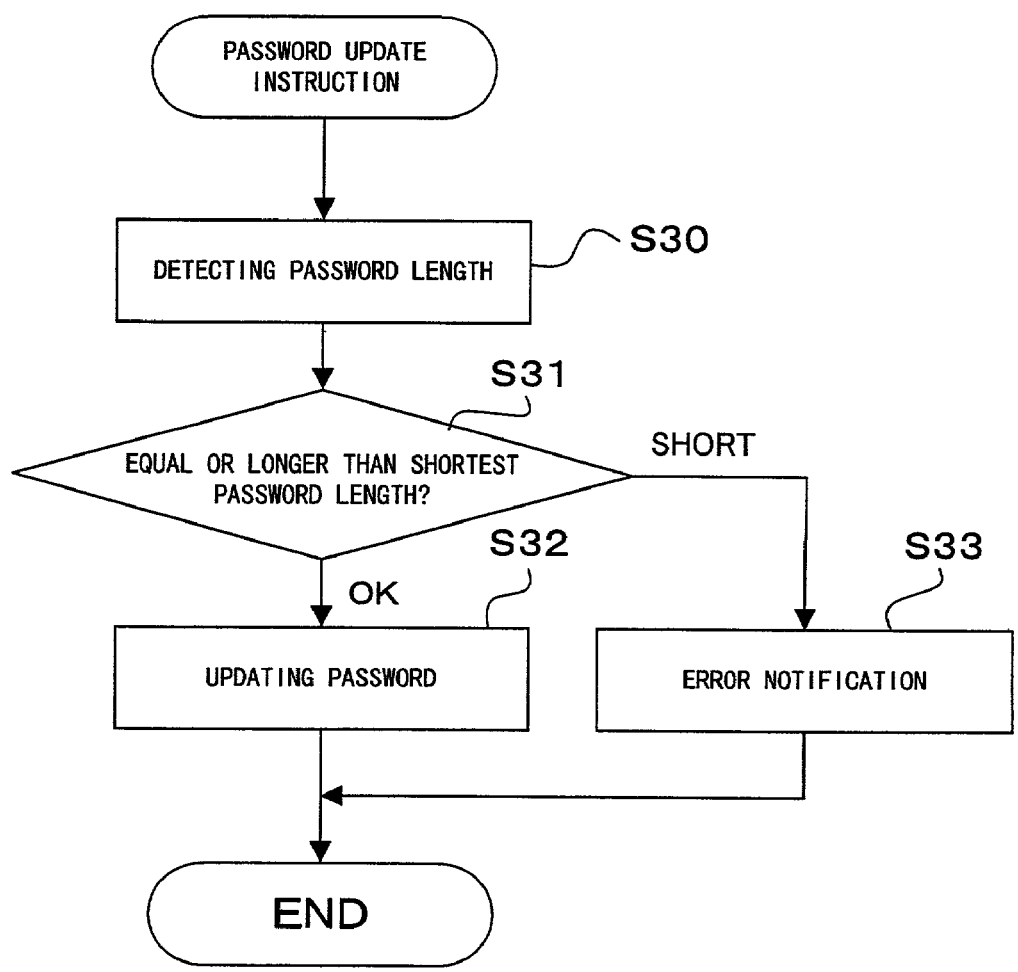
F I G. 1 8

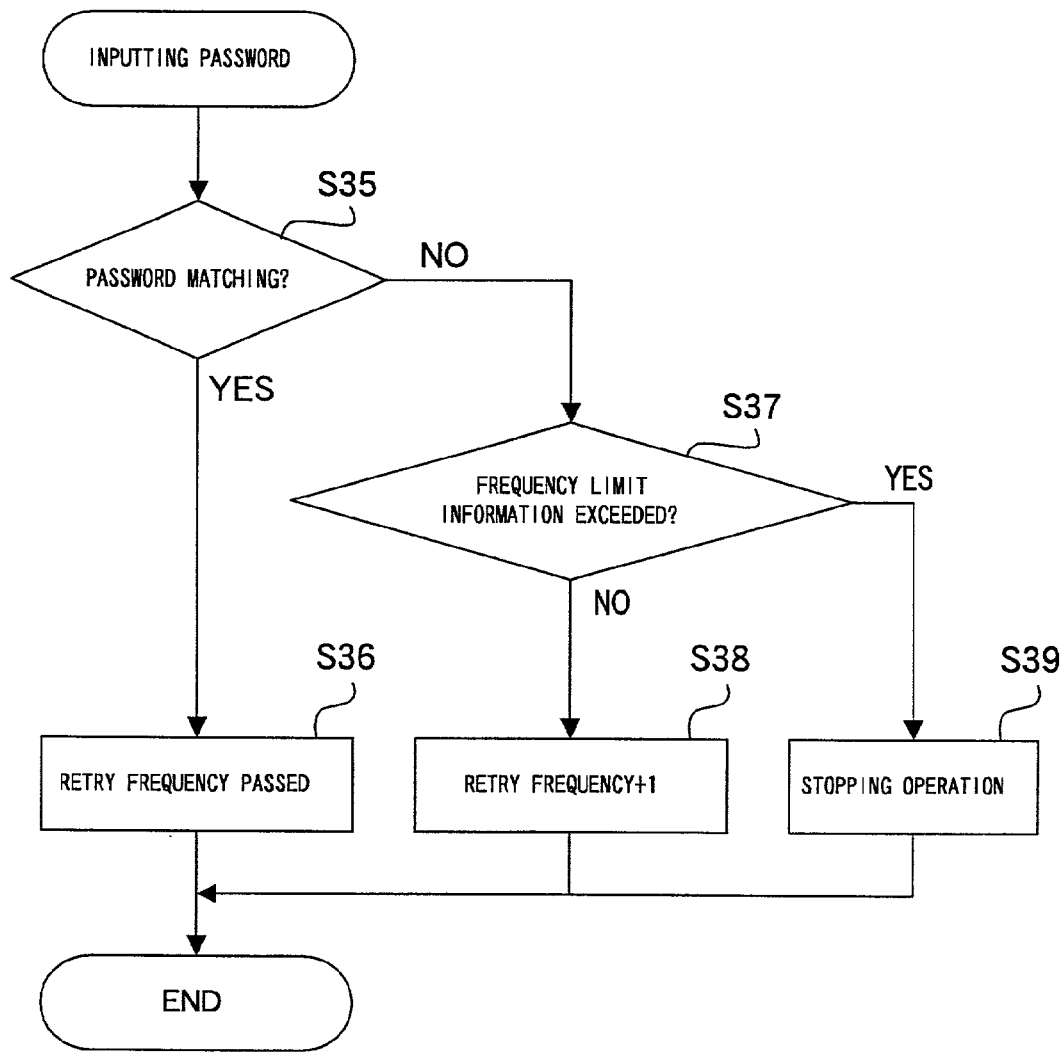
F I G. 1 9

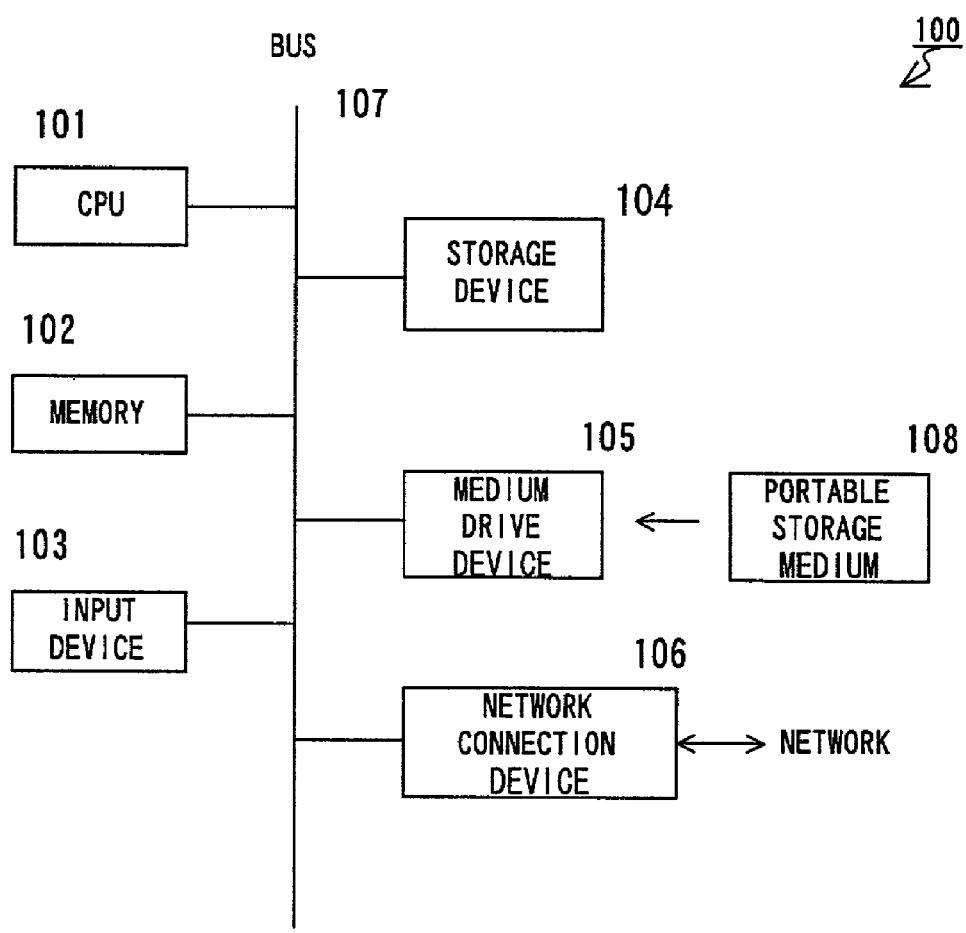
F I G. 2 1

DATE-AND-TIME MANAGEMENT DEVICE AND SIGNATURE GENERATION APPARATUS WITH DATE-AND-TIME MANAGEMENT FUNCTION

BACKGROUND OF THE INVENTION

1. Field of the Invention

The present invention relates to a date-and-time management device for managing date-and-time effective in a company or officially, and a signature generation apparatus for realizing a signature-with-time-stamp using the managed time.

2. Description of the Related Art

The date-and-time management device is required to manage the time of manufacture of products, for example, in a manufacturing industry, and is also required to realize a signature-with-time-stamp using the managed time. For example, the amount written on an electronic receipt can be prevented from being falsified by entering an officially authorized date-and-time.

In the date-and-time setting system for the date-and-time management device, there are some features as follows. First, only a specified date-and-time manager is allowed to set a date-and-time. Second, any unspecified date-and-time manager can also be allowed to set a date-and-time. Third, a user can specify a date-and-time manager. Fourth, the date-and-time set when a date-and-time management device is delivered cannot be amended.

For example, in the case of a signature-with-time-stamp device, there arises the problem with the effectiveness of the signed date-and-time if a unspecified date-and-time manager can be allowed to set a date-and-time, or if a user can freely specify a date-and-time manager. Therefore, it is normally designed to allow only a specified date-and-time manager to set a date-and-time.

However, considering an actual operation, an officially valid signature-with-time-stamp can be requested, or a signature-with-time-stamp effective only in a specified organization such as a company, etc. can be requested. Therefore, it is desired that the valid range of a signature can be almost freely set on an operation side. However, it has not been possible for conventional date-and-time management devices or signature-with-time-stamp devices to flexibly manage the valid range of a date-and-time to be managed.

SUMMARY OF THE INVENTION

The present invention has been developed to solve the above mentioned problems, and aims at providing a date-and-time management device and a signature-with-time-stamp device based on the managed date-and-time capable of, for example, not only setting a date-and-time by a date-and-time manager of a company or an organization, but also effectively managing a date-and-time for an external organization by allowing a specified date-and-time manager, for example, a national date-and-time management center to set a date-and-time to manage a value date-and-time for an external organization.

A first date-and-time management device according to the present invention is a date-and-time management device capable of inputting a date-and-time setting request from each of a plurality of date-and-time managers, and includes a date-and-time setting request reception unit and a clock unit.

The date-and-time setting request reception unit accepts a date-and-time setting request from any date-and-time manager before accepting a date-and-time setting request from a predetermined date-and-time manager (specified date-and-time manager) After accepting a date-and-time setting request from the specified date-and-time manager, the unit accepts a date-and-time setting request only from the specified date-and-time manager.

The clock unit functions in response to the date-and-time setting request accepted by the date-and-time setting request reception unit.

When the first date-and-time management device is used, for example, in a company, it can be set such that a specified date-and-time manager cannot issue a date-and-time setting request (or the request cannot be accepted). When the management is to be officially performed, a date-and-time setting request from a specified date-and-time manager (for example, a national date-and-time management center) is to be first accepted. Thus, the valid range of a date-and-time (and a signature) to be managed by each date-and-time management device can be almost freely set on an operation side.

A second date-and-time management device is a date-and-time management device capable of inputting a date-and-time setting request from each of a plurality of date-and-time managers in a hierarchical structure, and includes a date-and-time setting request reception unit and a clock unit.

After the date-and-time setting request reception unit accepts a date-and-time setting request from any date-and-time manager in the above mentioned plurality of date-and-time managers, it accepts a date-and-time setting request only from a date-and-time manager at a higher hierarchical level than the date-and-time manager whose requested has been accepted.

The clock unit functions in response to the date-and-time setting request accepted by the date-and-time setting request reception unit.

When the second date-and-time management device is used, for example, in a company, it can be set such that a date-and-time manager belonging to the company first issues a date-and-time setting request. When the device is to be officially effective (either from the beginning, or first in the company, and then for different use), a date-and-time setting request from a date-and-time manager belonging to a higher hierarchical level than the date-and-time manager in the company (for example, a national date-and-time management center) can be accepted.

Thus, the valid range of a date-and-time (and a signature) to be managed by each date-and-time management device can be almost freely set on an operation side.

BRIEF DESCRIPTION OF THE DRAWINGS

FIGS. 1A and 1B are block diagrams showing the configuration of the principle of the present invention;

FIG. 3 shows the hierarchical structure of a date-and-time management device;

FIG. 4 shows a basic system of setting date-and-time information and generating a signature for a signature-with-time-stamp device;

FIG. 11 shows the precision maintenance system of the clock in the date-and-time management device;

FIG. 12 is an entire flowchart of the signature-with-time-stamp generating process;

FIG. 14 shows in detail the process of generating a signature in the signature-with-time-stamp device;

FIG. 18 is a flowchart of the password updating process;

FIG. 19 is a flowchart of the password retry frequency limiting process;

FIG. 21 shows the configuration of the hardware of a computer.

DESCRIPTION OF THE PREFERRED EMBODIMENTS

Figure 2:
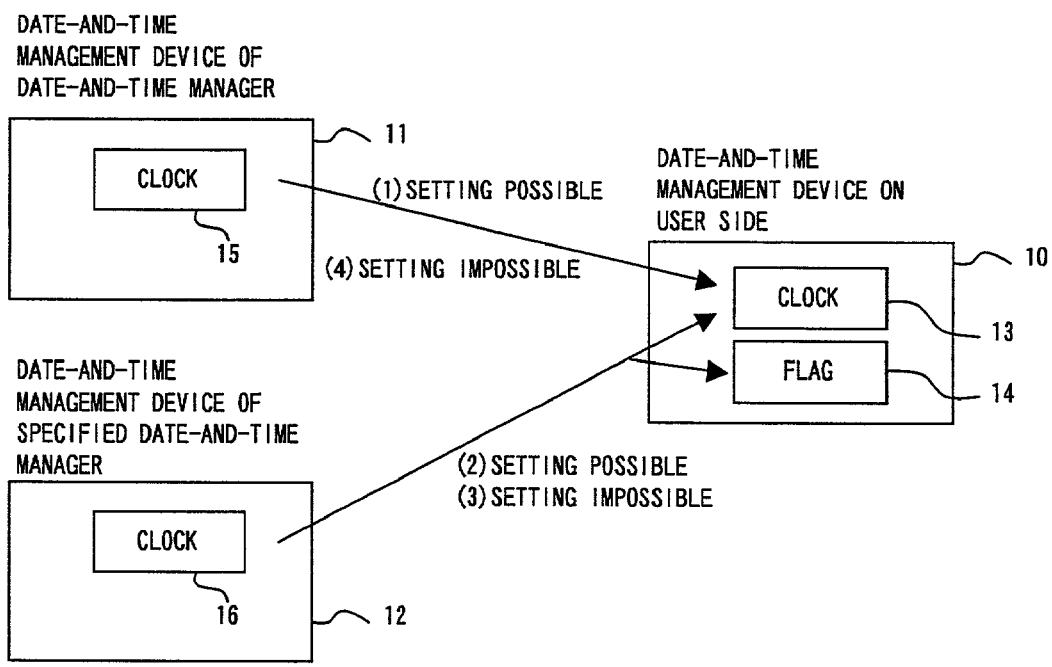
FIG. 2 shows a basic date-and-time settings system in the date-and-time management device.

FIGS. 1A and 1B is a block diagram of the configuration showing the principle of the present invention. FIG. 1A is a block diagram of the configuration showing the principle of the date-and-time management device according to the present invention. A date-and-time management device 1 comprises a date-and-time request reception unit 2 and a clock unit 3.

The date-and-time management device 1 allows each of a plurality of date-and-time managers to input a date-and-time setting request. The date-and-time request reception unit 2 accepts a date-and-time setting request from any date-and-time manager in the plurality of date-and-time managers before accepting a date-and-time setting request from a predetermined date-and-time manager, and accepts a date-and-time setting request only from the predetermined date-and-time manager after accepting the date-and-time setting request from the predetermined date-and-time manager. The clock unit 3 functions in response to an accepted date-and-time setting request.

Another aspect of the date-and-time management device 1 is a date-and-time management device capable of inputting a date-and-time setting request from each of a plurality of date-and-time managers in a hierarchical structure. In this date-and-time management device, after the date-and-time request reception unit 2 accepts a date-and-time setting request from any date-and-time manager in a plurality of date-and-time managers, it accepts a date-and-time setting request only from a date-and-time manager belonging to a higher hierarchical level in the hierarchical structure than the date-and-time manager whose request has been accepted. The clock unit 3 functions in response to an accepted date-and-time setting request.

Furthermore, for example, the present invention can be configured as follows although it is not shown in FIG. 1A.

First, a date-and-time management device for a manager is provided on a date-and-time manager side, and can comprise a date-and-time setting request unit for providing, as the date-and-time setting request, a request to copy a date-and-time managed by the device for the date-and-time request reception unit 2. The date-and-time setting request unit can further comprise a date-and-time copy data generation unit for generating data for copy of a date-and-time according to non-reproducible information transmitted from the date-and-time management device which has accepted the date-and-time setting request and using the date-and-time managed by the date-and-time management device for the manager.

Furthermore, the date-and-time copy data generation unit can generate data for copy of a date-and-time by encrypting the non-reproducible information and the managed date-and-time information, generate a signature from the result of encrypting the information, and generate data for copy of a date-and-time by combining the non-reproducible information, the managed date-and-time, and the signature.

It is also possible to provide a date-and-time management device at a deliverer of the device, and the device can comprise a date-and-time setting unit for setting a date-and-time.

FIG. 1B is a block diagram of the configuration showing the principle of a signature generation device 5 with a date-and-time management function. The device 5 includes a date-and-time management function of allowing each of a plurality of date-and-time managers to input a date-and-time setting request, and comprises a date-and-time setting request reception unit 6, a clock unit 7, and a signature generation unit 8.

The function of the date-and-time setting request reception unit 6 in the signature generation device 5 with the date-and-time management function is similar to the function of the date-and-time request reception unit 2 as shown in FIG. 1A. The function of the clock unit 7 is also similar to the function of the clock unit 3. The signature generation unit 8 generates a signature for input data to be signed.

The signature generation device 5 with the date-and-time management function can also includes a date-and-time management function of allowing each of a plurality of date-and-time managers in a hierarchical structure to input a date-and-time setting request. In the device, after the date-and-time setting request reception unit 6 accepts a date-and-time setting request from any date-and-time managers in the plurality of date-and-time managers, it accepts a date-and-time setting request only from a date-and-time manager belonging to a higher hierarchical level in the hierarchical structure than the date-and-time manager whose request has been accepted. The clock unit 7 functions in response to an accepted date-and-time setting request. The signature generation unit 8 generates a signature for input data to be signed according to the date-and-time information indicated by the clock unit 7.

Furthermore, the present invention can be configured as follows although it is not shown in FIG. 1B. That is, the signature generation device 5 with the date-and-time management function can further comprise a signature stop unit for stopping the signature generation unit 8 generating a signature when the stop of the operation of the clock unit 7 is detected. The signature generation device 5 can include one or more functions other than the function of generating a signature, and can comprise an other function execution unit for allowing the other functions than the function of generating a signature to be executed.

Otherwise, the present invention can furthermore comprise a date-and-time setter information storage unit for storing the information about a date-and-time setter whose date-and-time setting request has been accepted latest by the date-and-time setting request reception unit 6, and the signature generation unit 8 can generate a signature according to the information about the date-and-time setter. Additionally, the present invention can comprise a date-and-time setting frequency information storage unit for storing the number of date-and-time setting requests accepted up to the current time by the date-and-time setting request reception unit 6, and the signature generation unit 8 can generate a signature according to the date-and-time setting frequency information in addition to the date-and-time information.

The present invention can furthermore comprise a data processing device although it is not shown in FIG. 1A or 1B. The data processing device has the function of encrypting input data or generating a signature for input data, and comprises a retry frequency limiting unit for limiting the retry frequency by a user corresponding to the password retry frequency limit set by a manager of an organization to which the user of the data processing device belongs.

Furthermore, the data processing device having the function of encrypting input data or generating a signature for the input data comprises a password update unit for updating a password when the length of an updated password in a password update request from a user is equal to or longer than the shortest password by referring to the shortest password length set by the manager of the organization to which the user of the data processing device belongs.

In addition, the present invention can comprise a signature verification device for verifying the signature applied to the input data although it is not shown in FIG. 1A or 1B. The signature verification device comprises a signature verification result display unit for indicating whether or not the signature is a valid signature for the input data.

A date-and-time managing method is used, when each of a plurality of date-and-time managers can input a date-and-time setting request, by accepting a date-and-time setting request from any date-and-time manager in the plurality of date-and-time managers before accepting a date-and-time setting request from a predetermined date-and-time manager, accepting a date-and-time setting request only from the predetermined date-and-time manager after accepting the date-and-time setting request from the predetermined date-and-time manager, and allowing a clock to functioning in response to an accepted date-and-time setting request.

A signature generating method is used, with a signature generation device including a date-and-time management function capable of allowing each of a plurality of date-and-time managers to input a date-and-time setting request, by accepting a date-and-time setting request from any date-and-time manager in the plurality of date-and-time managers before accepting a date-and-time setting request from a predetermined date-and-time manager, accepting a date-and-time setting request only from the predetermined date-and-time manager after accepting the date-and-time setting request from the predetermined date-and-time manager, allowing a clock to functioning in response to an accepted date-and-time setting request, and generating a signature for the data to be signed which is input according to the date-and-time information indicated by the clock.

The present invention can be configured as a storage medium. That is, for example, a computer-readable portable storage medium used in a computer capable of allowing each of a plurality of date-and-time managers to input a date-and-time setting request, and managing a date-and-time stores a program comprising the steps of accepting a date-and-time setting request from any date-and-time manager in the plurality of date-and-time managers before accepting a date-and-time setting request from a predetermined date-and-time manager, accepting a date-and-time setting request only from the predetermined date-and-time manager after accepting the date-and-time setting request from the predetermined date-and-time manager, and allowing a clock to functioning in response to an accepted date-and-time setting request.

Furthermore, a computer-readable portable storage medium used in a computer including a date-and-time management function capable of allowing each of a plurality of date-and-time managers to input a date-and-time setting request, and generating a signature stores a program comprising the steps of accepting a date-and-time setting request from any date-and-time manager in the plurality of date-and-time managers before accepting a date-and-time setting request from a predetermined date-and-time manager, accepting a date-and-time setting request only from the predetermined date-and-time manager after accepting the date-and-time setting request from the predetermined date-and-time manager, allowing a clock to functioning in response to an accepted date-and-time setting request, and generating a signature for the data to be signed which is input according to the date-and-time information indicated by the clock.

As described above, a date-and-time setting request from a specified date-and-time manager in a plurality of date-and-time managers is accepted by priority, or a a date-and-time setting request from a date-and-time manager at a higher hierarchical level in a plurality of date-and-time managers in a hierarchical structure is accepted by priority.

Mainly described below in detail are a date-and-time management device and a signature-with-time-stamp device with date-and-time management function. For example, the signature-with-time-stamp device allows a user to apply a signature-with-time-stamp for replacing a date and seal to an electronic document. The validity of the signature-with-time-stamp depends on the validity of the correctly managed date-and-time.

In a narrow concept, for example, it is accepted only if the date-and-time is valid in a company. For example, if documents such as those generated in a notary's office is to be officially valid, it is necessary to guarantee the managed date-and-time by a national organization, that is, the date-and-time is to be managed as the date-and-time managed by the date-and-time management center, etc.

The relationship between a date-and-time manager and a user is not specifically regulated. As a practical example, a 'date-and-time manager' is a system manager in a company for a user in the company. A 'specified date-and-time manager' described later can be a national date-and-time management center, a deliverer of devices, etc.

It is difficult for a deliverer of devices to deliver them by determining whether a signature-with-time-stamp is to be valid only in a company in a user operation format, or it is to be officially valid. Furthermore, it is not appropriate to apply an official signature-with-time-stamp function to a user who uses only an in-house signature-with-time-stamp function. Furthermore, there may be the case in which a signature-with-time-stamp function is to be extended during the operation.

Therefore, when a device is delivered, for example, the deliverer allows an in-house date-and-time manager to set a date-and-time. After accepting the date-and-time settings from a 'specified date-and-time manager' (for example, a national date-and-time management center), it is necessary to accept the settings only from the 'specified date-and-time manager'.

FIG. 2 shows the basic date-and-time setting system in the date-and-time management device according to the present invention. In FIG. 2, it is assumed that a date-and-time management device 10 on the user side can accept the date-and-time settings from any date-and-time manager at first. For example, a date-and-time management device 11 of a date-and-time manager of a company to which the user belongs sets date-and-time information based on an in-house clock 13 of the date-and-time management device 10 on the user side in step (1). At this time, since the in-house date-and-time manager is not a 'specified date-and-time manager' (for example, a date-and-time manager of a national date-and-time management center, a date-and-time manager of a deliverer of the device, etc.), a flag 14 remains 'OFF' although the date-and-time information is set in the clock 13.

The flag 14 is necessarily checked when the date-and-time information is set in the clock 13 in the date-and-time management device 10 on the user side. When the flag is set OFF, and when the date-and-time settings are accepted from the specified date-and-time manager (for example, the above mentioned date-and-time management center), the flag is set ON.

In FIG. 2, when a date-and-time management device 12 of the national date-and-time management center, that is, a specified date-and-time manager sets the date-and-time information for the date-and-time management device 10 on the user side, the operation of the clock 13 is performed according to the date-and-time information, and the flag 14 is set ON.

After the flag 14 is set ON, the date-and-time management device 10 on the user side accepts the date-and-time settings from a specified date-and-time manager, but does not accept the settings of date-and-time information from other date-and-time managers. That is, in step (3), the date-and-time management device 12 of a 'specified date-and-time manager' can set the date-and-time information, that is, can change the date-and-time information. However, the date-and-time management device 11 of a date-and-time manager of, for example, a company cannot set the date-and-time information in step (4) because the date-and-time management device 10 on the user side does not accept the settings.

FIG. 3 shows the hierarchical structure of date-and-time management devices. In FIG. 3, date-and-time management devices 21 through 25 are the date-and-time management devices at a lowest hierarchical level. Among them the date-and-time management devices 21 through 23 belong to an area A, and the five date-and-time management devices 21 through 25 belong to an area B.

Date-and-time management devices 26 and 27 are the date-and-time management devices at an intermediate hierarchical level. The device 26 belongs to a higher hierarchical level than the date-and-time management devices 21 through 23. In the area B excluding the area A, the device 27 is higher than the date-and-time management devices 24 and 25 in the hierarchical structure.

A date-and-time management device 28 is the device at the highest hierarchical level, and is therefore higher than the intermediate date-and-time management devices 26 and 27.

The validity of the date-and-time information managed by a date-and-time management device is to be guaranteed in a given area. For example, when the date-and-time management device 26 sets a date-and-time for the date-and-time management device 21, the date-and-time management device 21 can function as a date-and-time management device whose date-and-time is guaranteed in the area A. When the date-and-time management device 28 at the highest hierarchical level sets the date-and-time for the date-and-time management device 21 through the intermediate date-and-time management device 26, the date-and-time management device 21 functions as a date-and-time management device whose date-and-time information is guaranteed in the area B.

Thus, when the date-and-time management device 28 at the highest hierarchical level sets the date-and-time for a device whose date-and-time information is guaranteed in the area B, the device cannot accept the date-and-time settings from the intermediate date-and-time management device 26 because the date-and-time information, which is guaranteed only in the area A, is set if the device accepts the re-settings, that is, a change, of the date-and-time from the intermediate date-and-time management device 26. Similarly, for example, the date-and-time management device 24 at a lower hierarchical level than the intermediate date-and-time management device 27 functions. In FIG. 3, it is assumed that the date-and-time management devices form a three-level hierarchical structure, but similar operations are performed in a structure having a four or more hierarchical levels.

A hierarchical structure of date-and-time managers or date-and-time setting organizations can be formed by, for example, a global organization at the highest hierarchical level, intermediate organizations from countries, and enterprises at the lowest level. Otherwise, it can be formed by an official organization of Japan at the highest hierarchical level, deliverers of devices at an intermediate hierarchical level, and enterprises at the lowest hierarchical level. In addition, a hierarchical structure can be formed by a larger number of hierarchical levels.

In FIG. 3, the date-and-time management devices at the lowest hierarchical level (normally the date-and-time management devices of users), the date-and-time management devices at the intermediate hierarchical level, and the date-and-time management device at the highest hierarchical level basically perform the same operations. The difference among them is that the date-and-time management device at the highest hierarchical level performs only the date-and-time setting operation, and the date-and-time management devices of users at the lowest hierarchical level only receive the date-and-time settings.

Furthermore, the date-and-time management devices of the users have to be protected by cases, etc. to prevent the set time from being changed by respective users. For example, the date-and-time management device at the intermediate or the highest hierarchical level can be a server located in a strictly controlled server room, and any other embodiment depending on the situation.

In the case of the signature-with-time-stamp device described later, it is determined whether or not the functions are different between a device at a higher hierarchical level and a device at a lower hierarchical level depending on whether or not the device at a higher hierarchical level requires a signature function. When the device at a higher hierarchical level only set a date-and-time, the signature function is not required. However, if the device at a higher hierarchical level verifies the signature of a device at a lower hierarchical level, or has the signature function as a device at a higher hierarchical level, then the device at a higher hierarchical level similarly functions as a signature device performing the same operation as the device at a lower hierarchical level.

FIG. 4 shows the basic system for setting date-and-time information for a signature-with-time-stamp device. In FIG. 4, a signature-with-time-stamp device 30 on the user side comprises the clock 13 and the flag 14 as shown in FIG. 2. When the flag 14 is set OFF as shown in FIG. 2, for example, both date-and-time management device 11 of the date-and-time manager of a company to which a user belongs, and date-and-time management device 12 of a 'specified date-and-time manager' (for example, a national time management center) can set a time.

However, if the date-and-time settings from the date-and-time management device 12 of the 'specified date-and-time manager' is accepted and the information is set in the clock 13 in FIG. 4 as shown in FIG. 2, then other date-and-time information settings than those of the 'specified date-and-time management device' cannot be accepted.

When data to be signed 31 is externally input to the signature-with-time-stamp device 30 on the user side, the input data and the date-and-time information output from the clock 13 are linked 32 (for example, the bits of the date-and-time information are arranged after the data bits), a signature is generated 34 using a signature key 33, and the date-and-time information with signature 35 is externally output.

Figure 5:
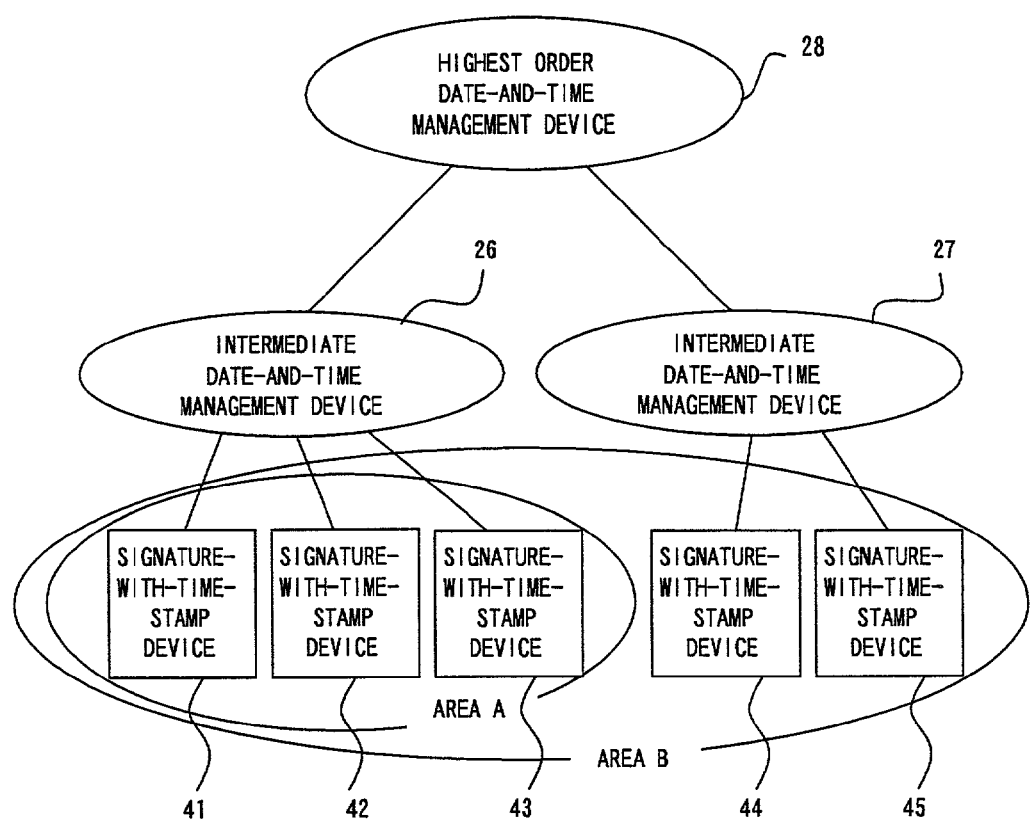
FIG. 5 shows the hierarchical structure of the date-and-time management for a signature-with-time-stamp device.

FIG. 5 shows the hierarchical structure of the date-and-time management for signature-with-time-stamp devices. In FIG. 5, the date-and-time management devices 21 through 25 shown in FIG. 3 are replaced with signature-with-time-stamp devices 41 through 45 at the lowest hierarchical level.

The system of setting a date-and-time for each of the signature-with-time-stamp devices is the same as that shown in FIG. 3. For example, if the signature-with-time-stamp device 41 accepts the date-and-time settings from the date-and-time management device 28 at the highest hierarchical level, then it does not accept date-and-time settings from the intermediate date-and-time management device 26. This holds true with the date-and-time settings for the signature-with-time-stamp device 44 at a lower hierarchical level than the date-and-time management device 27.

Figure 6:
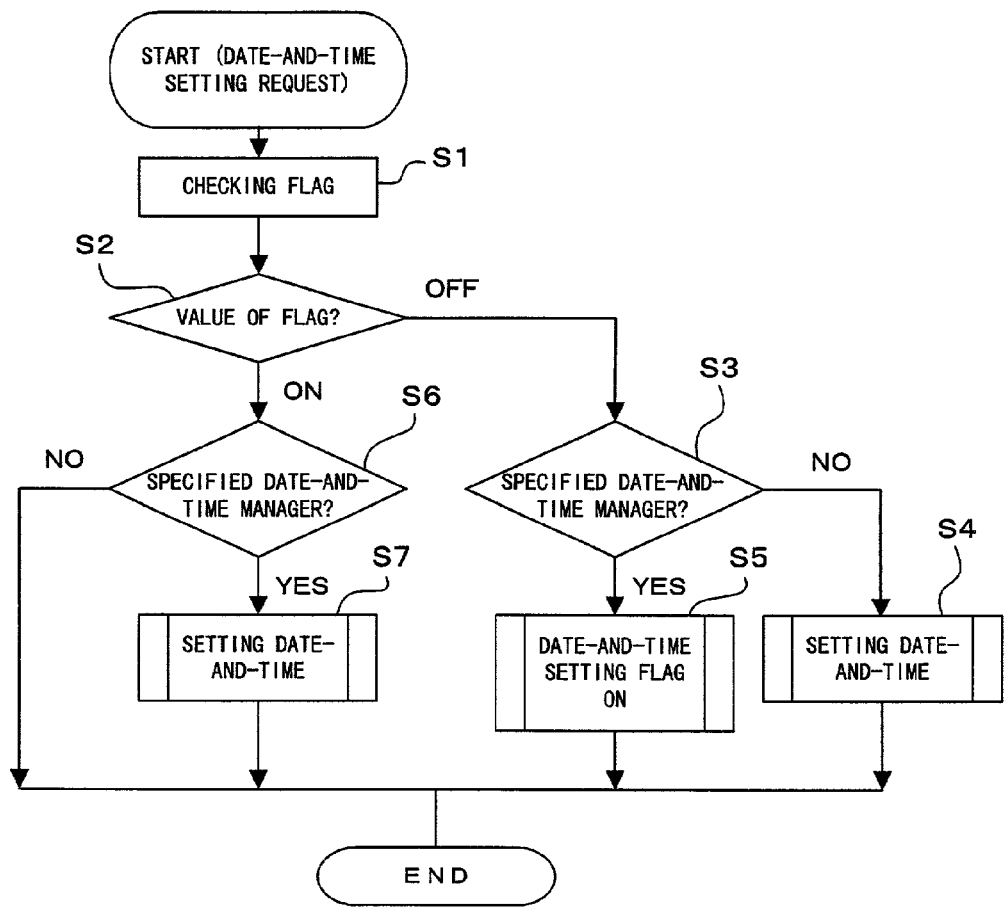
FIG. 6 is a basic flowchart of a date-and-time setting process.

The operations of the date-and-time management device according to an embodiment of the present invention are described below by referring to FIGS. 6 through 10. FIG. 6 is a flowchart of the process of setting a date-and-time for a date-and-time management device, and is a flowchart of the process corresponding to the process shown in FIG. 2. In FIG. 6, a process start with a date-and-time setting request, for example, from the date-and-time management device 11 of a date-and-time manager in a company as shown in FIG. 2. First, in step S1, the value of the flag 14 is checked, and it is determined in step S2 whether the value of the flag is ON or OFF.

In FIG. 2, if the date-and-time management device 12 of, for example, the national date-and-time management center has not set the date-and-time, the flag is set OFF, and it is determined in step S3 whether or not the manager issuing a date-and-time setting request is a 'specified date-and-time manager'. If the manager is not a 'specified date-and-time manager' such as a national date-and-time management center, etc., the date-and-time is set in the clock 13, thereby terminating the process. If the manager is a 'specified date-and-time manager', then the date-and-time is set in step S5, and the flag 14 is set ON, thereby terminating the process.

In this example, the flag is first set OFF, and a manager other than a 'specified date-and-time manager' can set a date-and-time. However, only a specified date-and-time manager can be allowed to set a date-and-time by, for example, setting the flag ON when a device is delivered.

When the flag is set ON in step S2, that is, if the date-and-time has already been set by a 'specified date-and-time manager', then it is determined in step S6 whether or not the manager issuing the date-and-time setting request is the 'specified date-and-time manager'. If yes, the date-and-time is set in step S7. If no, then the process terminates immediately. If the manager is not a 'specified date-and-time manager' (step S7, NO), an error notification, etc. is issued as necessary, but the detailed explanation is omitted here.

According to the present embodiment, it is determined depending on the value of a flag as to whether or not a 'specified date-and-time manager' has set a date-and-time. However, it is not always necessary to use a flag, but any other means can be used only if it can be determined whether or not a date-and-time has been set by a 'specified date-and-time manager'.

Figure 7:
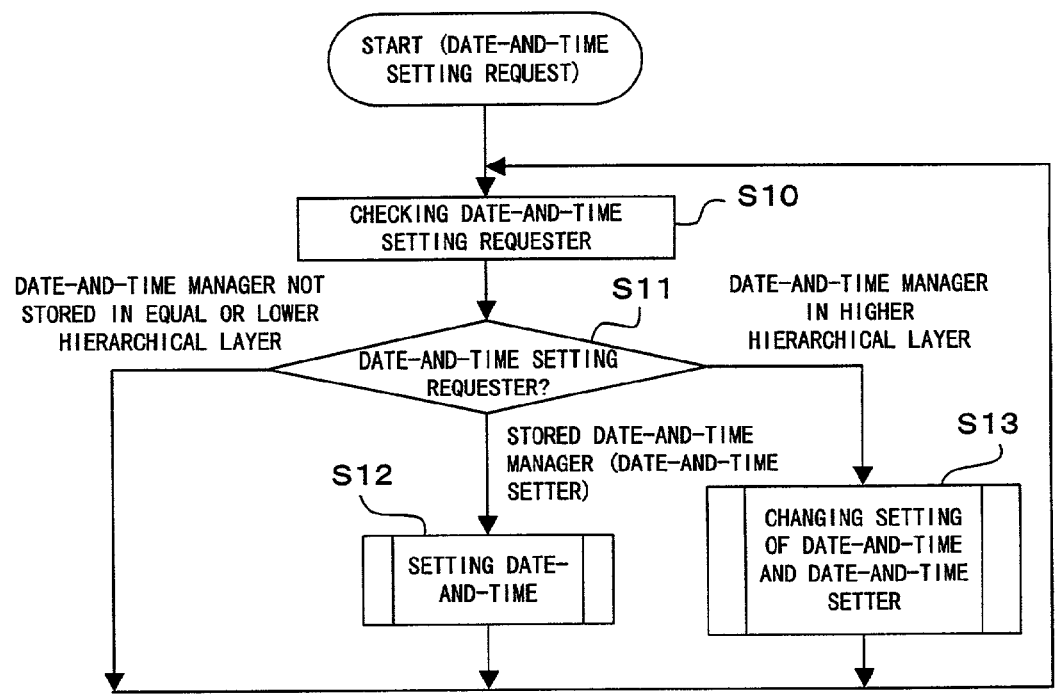
FIG. 7 is a flowchart of a date-and-time setting process performed when a date-and-time management device has a hierarchical structure.

FIG. 7 is a flowchart of a date-and-time setting process in which date-and-time management devices form a hierarchical structure as shown in FIG. 3.

In FIG. 7, when the process starts in response to a date-and-time setting request, the date-and-time setting requester is first checked in step S10, and it is determined in step S11 whether the date-and-time setting requester is a date-and-time manager at a higher hierarchical level, a date-and-time setter, or a date-and-time manager at a lower hierarchical level or at the same hierarchical level who is a date-and-time manager but not a date-and-time setter. A date-and-time setter refers to a date-and-time manager who sets the valid date-and-time information at the current time in the clock 13 of the date-and-time management device 10 shown in FIG. 2 (that is, the latest date-and-time information setter), and the information is stored in the memory of the date-and-time manager as described later.

If the requester is a date-and-time setter (that is, the date-and-time manager who latest set a date-and-time), then a date-and-time is set in step S12, that is, the date-and-time is changed, and the process terminates.

If the date-and-time setting request is a date-and-time manager at a higher hierarchical level, then a date-and-time is set in step S13, and the date-and-time setter is changed as necessary, that is, when the date-and-time manager at a higher hierarchical level is not a date-and-time setter stored in the current device, thereby terminating the process.

If it is determined in step S11 that the date-and-time setting requester is a date-and-time manager at a lower hierarchical level, or a date-and-time manager at the same level who is not a date-and-time setter stored in the device, then the date-and-time is not set, thereby terminating the process.

Figure 8:
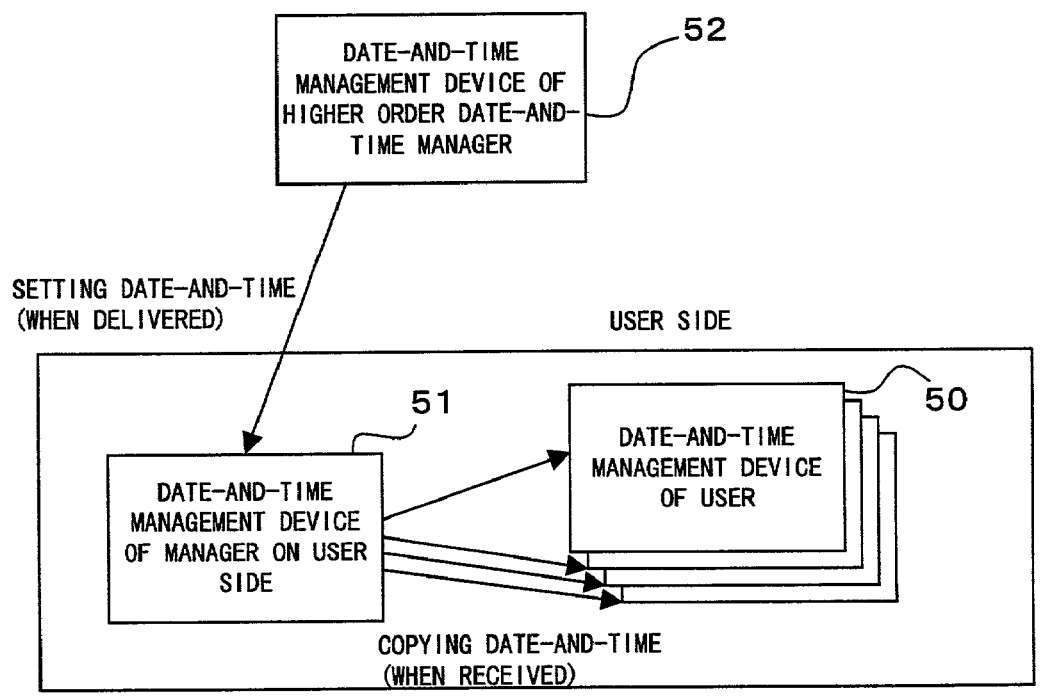
FIG. 8 shows an example of an operation of the date-and-time management device.

FIG. 8 shows an example of the operation of the date-and-time management device according to the present embodiment. In FIG. 8, the user side (for example, a company) includes a date-and-time management device for a common user (normally a plurality of date-and-time management devices 50 and a date-and-time management device 51 of the manager on the user side). The date-and-time management device 50 of the user is managed by the date-and-time management device 51 of the manager on the user side. For example, when a date-and-time management device is delivered, a date-and-time management device 52 of a date-and-time manager at a higher hierarchical level sets a date-and-time only for the date-and-time management device 51 of the manager on the user side. The date-and-time management device at a higher hierarchical level can be, for example, a device in a national date-and-time management center, or a device provided in the deliverer.

After a date-and-time management device is delivered, the manager on the user side initializes the date-and-time management device 50 of the user. Simultaneously, the date-and-time of the date-and-time management device 51 of the manager on the user side is copied to the date-and-time management device 50 of the user. As a result, all date-and-time management devices become operable in synchronization with the time of the date-and-time management device 51 of the manager on the user side in the organization on the user side (for example, in a company).

The date-and-time for the date-and-time management device 51 of the manager on the user side and the date-and-time for the date-and-time management device 50 of the user are not to be necessarily set when the devices are delivered or initialized, but can be set at any appropriate timing. In this example, a date-and-time is set only for the date-and-time management device 51 of the manager on the user side when the devices are delivered. However, it is obvious that the date-and-time can be set for the date-and-time management device 50 of the user when it is delivered.

Figure 9:
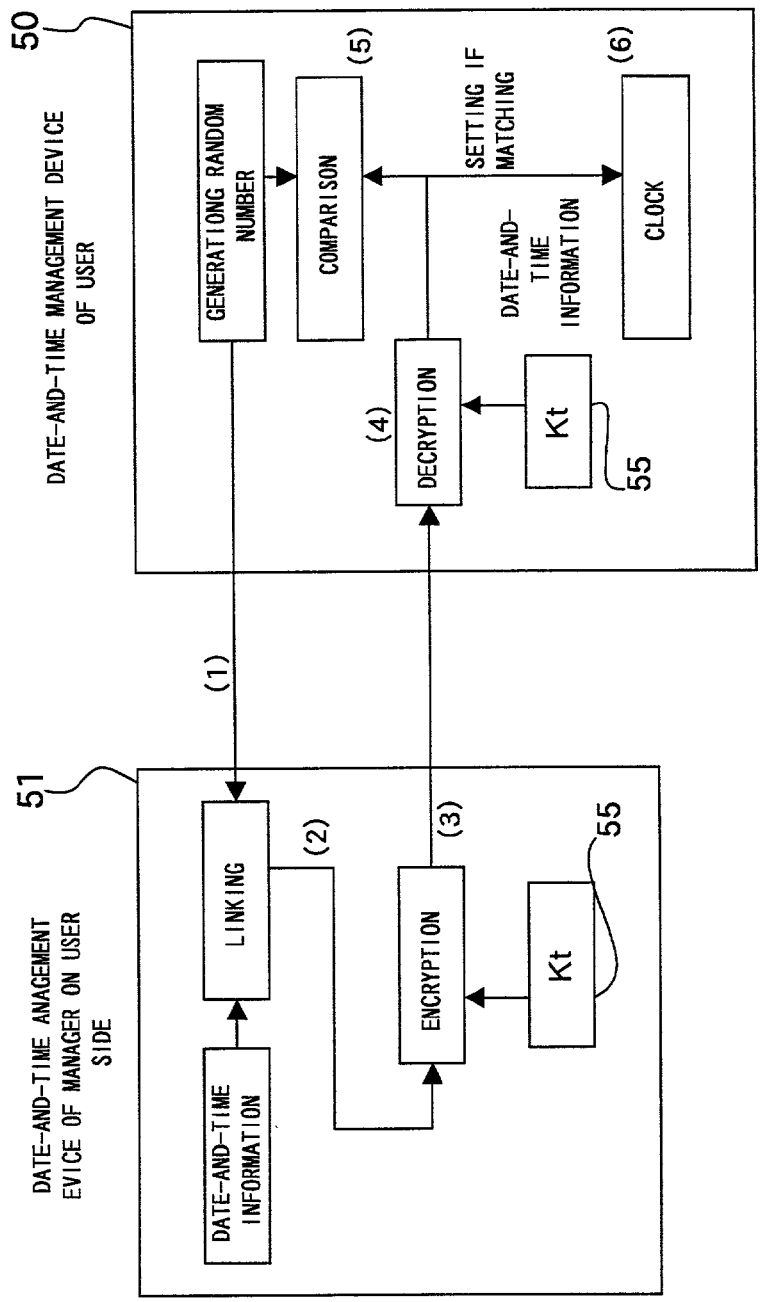
FIG. 9 shows in detail the date-and-time information copy system.

FIG. 9 shows in detail the date-and-time information copy system shown in FIG. 8. In FIG. 9, the date-and-time management device 50 of the user and the date-and-time management device 51 of the manager on the user side store a common secret key Kt 55.

For example, in response to the date-and-time setting request from the date-and-time management device 51 of the manager on the user side, the date-and-time management device 50 of the user generates a random number and transmits it to the date-and-time management device 51 of the manager on the user side in step (1). The random number can be any non-reproducible information, for example, serial numbers.

A random number is transmitted from the user side to prevent the date-and-time information from being re-transmitted from the manager side. The user side requires the date-and-time information transmitted immediately after the random number is transmitted. For example, the date-and-time information of one week before cannot be re-transmitted.

The date-and-time management device 51 of the manager on the user side links the received random number with the date-and-time information in step (2), encrypts the above mentioned linked information using the secret key Kt 55 in step (3), and transmits the result to the date-and-time management device 50 of the user.

Instead of linking the random number with the date-and-time information, encrypting them, and transmitting the result, a signature is generated using the key Kt, and the signature and the data obtained by linking the random number with the date-and-time information can be transmitted as is (that is, as plaintext). The signature system is described later. The secret key Kt 55 can be a common key among a plurality of date-and-time management devices 50 of the user, or a different key for each device. Furthermore, a public key can replace the secret key Kt 55 for encryption, or a signature can be generated using a private key.

A signature generated in the DES-MAC system described later is in the finally 8-byte output, the higher order 4 bytes are used as the signature. On the other hand, when the above mentioned random number is linked with the date-and-time information for encryption, all of the finally encrypted output is used as the encryption result to be transmitted to the user. When a signature is used instead of the encryption, the user checks the signature as described later so that the validity of the date-and-time setting message transmitted from the date-and-time manager can be confirmed.

The date-and-time management device 50 of the user decrypts the received information using a secret key Kt, and the obtained random number is compared in step (5) with the random number generated in step (1). If the random numbers match each other, the date-and-time information is set in the clock in step (6), thereby terminating the copy of the date-and-time.

Figure 10:
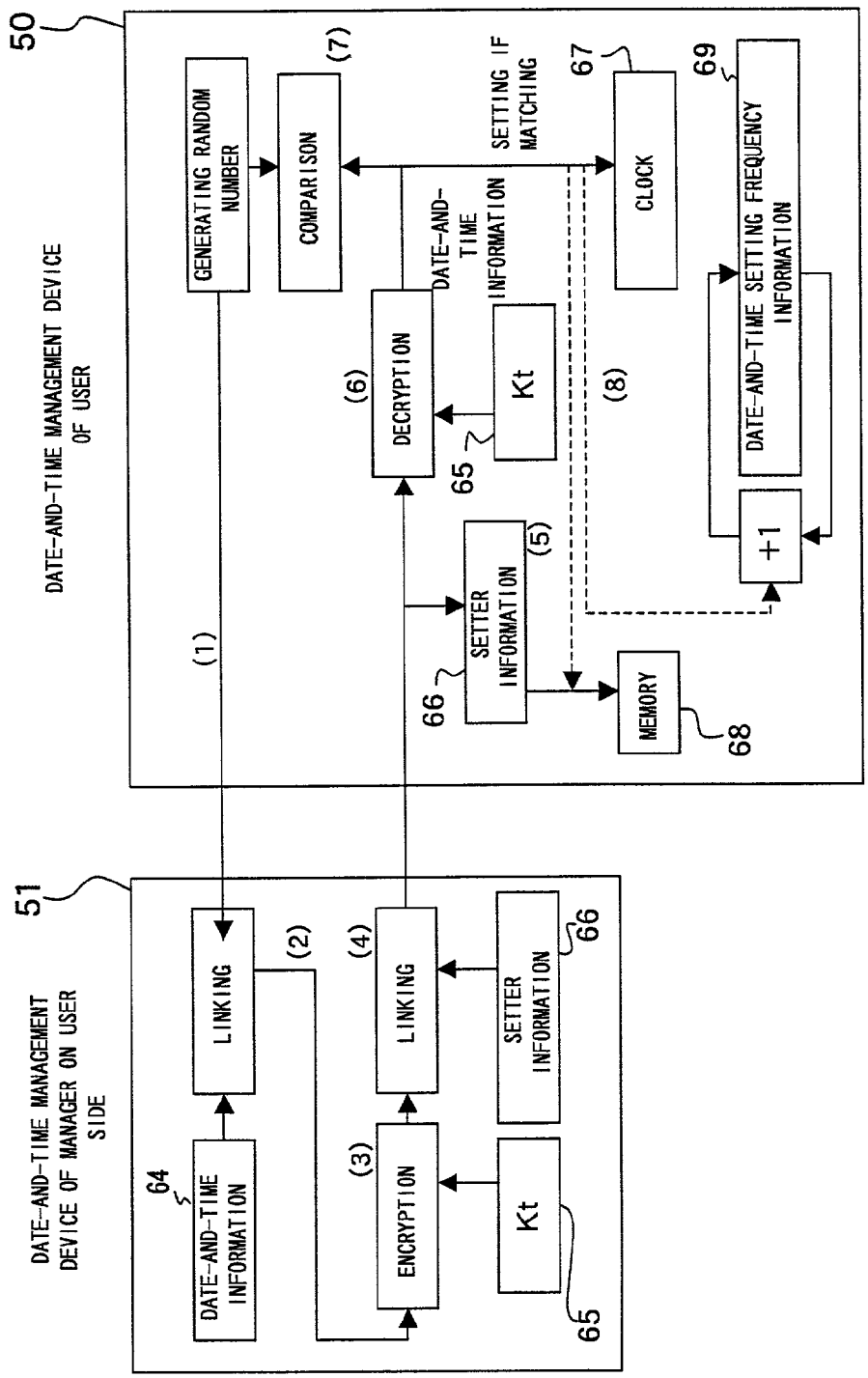
FIG. 10 shows another example of the date-and-time information copy system.

FIG. 10 shows another example of the system of copying the date-and-time information to the date-and-time management device of a user. FIG. 10 shows the system of setting a date-and-time in which the date-and-time information is copied as shown in FIG. 9, and the information about the date-and-time setter described by referring to FIG. 7 and the information about the frequency of setting a date-and-time are stored in the memory.

In FIG. 10, first in step (1), the date-and-time management device 50 of the user generates a random number, and transmits it to, for example, the date-and-time management device 51 of the manager on the user side. The date-and-time management device 51 of the manager on the user side links the received random number with date-and-time information 64 in step (2), the linked information is encrypted using a secret key Kt 65 in step (3), setter information 66 is linked to the encrypted information in step (4), and the result is transmitted to the date-and-time management device 50 of the user.

The date-and-time management device 50 of the user retrieves the setter information 66 from the received information, decrypts the received information using the secret key Kt 65 corresponding to the date-and-time manager who is currently setting a date-and-time (in this example, a manager on the user side) in step (6), retrieves a random number from the decrypted information, and compares it with the random number generated by the device in step (1) and transmitted to the user manager, in step (7).

If the two random numbers match each other as a result of the comparison, the operation of a clock 67 is controlled, the setter information 66 is stored in memory 68, and date-and-time setting frequency information 69 is incremented. If the memory 68 has already stored the information about a date-and-time setter, then the information is updated as necessary. The contents of the setter information 66 can be a setter ID, the hierarchical level, etc.

The setter information 66 is retrieved from the data received by the date-and-time management device 50 of the user because the information stores a key for use in decryption corresponding to each of a plurality of date-and-time managers, and the decrypting process is performed using a key corresponding to the manager who is currently setting a date-and-time (in this example, a manager on the user side).

The above mentioned date-and-time setting frequency information is incremented for the following reason.

First, a signature-with-time-stamp is applied at a time a.

Then, assume that a signature-with-time-stamp is applied at a time b after date-and-time information is set.

Normally, b>a, and it is determined that the signature with the time a is applied earlier. However, if time is set back in setting the date-and-time information (for example, since the clock 67 of the date-and-time management device 50 of the user is one hour fast, the date-and-time management device 51 of the manager on the user side sets the date-and-time information such hat the clock can be set back by one hour), b can be smaller than a (b<a).

In this case, there can be the problem of the order of signatures in the signature-with-time-stamp system. To solve the problem, that is, to recognize that a is earlier than b in the actual order of signatures although the time information indicates b<a, the date-and-time setting frequency information is to be added to a signature. In the example above, the date-and-time information is set after applying the signature at the time a, and the date-and-time setting frequency information is incremented. Therefore, the date-and-time setting frequency information added to the signature applied at the time b is larger than the information about the time a.

Therefore, by referring to the date-and-time setting frequency information, a correct order of signatures can be determined (the order of the signatures indicating the same date-and-time setting frequency information can be determined by the time added to each of the signatures, and the order of the signatures indicating different date-and-time setting frequency information can be determined by the values of the date-and-time setting frequency information).

FIG. 11 shows the system of maintaining the precision of the clock in the date-and-time management device. In FIG. 11, for example, the date-and-time management device 50 of the user contains a date-and-time setting circuit 56 which processes the date-and-time settings information transmitted from the date-and-time management device 51 of the manager on the user side as shown in FIG. 9. If the comparison between the random numbers indicating a matching result as described above, the received date-and-time information is set in date-and-time information 58 in a real time clock (RTC) 57.

In this real time clock 57, correction information 59 for correcting uneven frequencies by the individual characteristic of a crystal oscillator, and changing the frequency division ratio of an oscillator to improve the precision of a clock is used. If the backup of a battery terminates in such a real time clock 57, the set value of the correction information 59 is deleted. Therefore, according to the present embodiment, the correction information is stored in nonvolatile memory 60 so that correction information 61 stored in the nonvolatile memory 60 can be read after the external date-and-time settings and set in the real time clock 57 if, for example, the backup of the battery terminates, thereby guaranteeing the precision of the clock.

According to the present embodiment, a secondary battery is used as a power source of the real time clock 57. Using the secondary battery, the battery can be charged when the power source is restored even after a power failure, and the clock can be re-driven.

The embodiment of the signature-with-time-stamp device is described below by referring to FIGS. 12 through 19. FIG. 12 is a flowchart of the entire process performed when a signature-with-time-stamp generation request, that is, a request to generate a signature-with-time-stamp with the data to be signed 31 externally provided as described above by referring to FIG. 4, is issued.

When the process starts as shown in FIG. 12, it is checked in step S20 whether or not the clock correctly works, and the date-and-time information is reliable, it is determined in step S21 whether or not the clock has stopped (or temporarily stopped). If it has not stopped, then a signature is generated in step S22, thereby terminating the process. If the clock has stopped, then an error notification is issued in step S23, thereby terminating the process.

Figure 13:
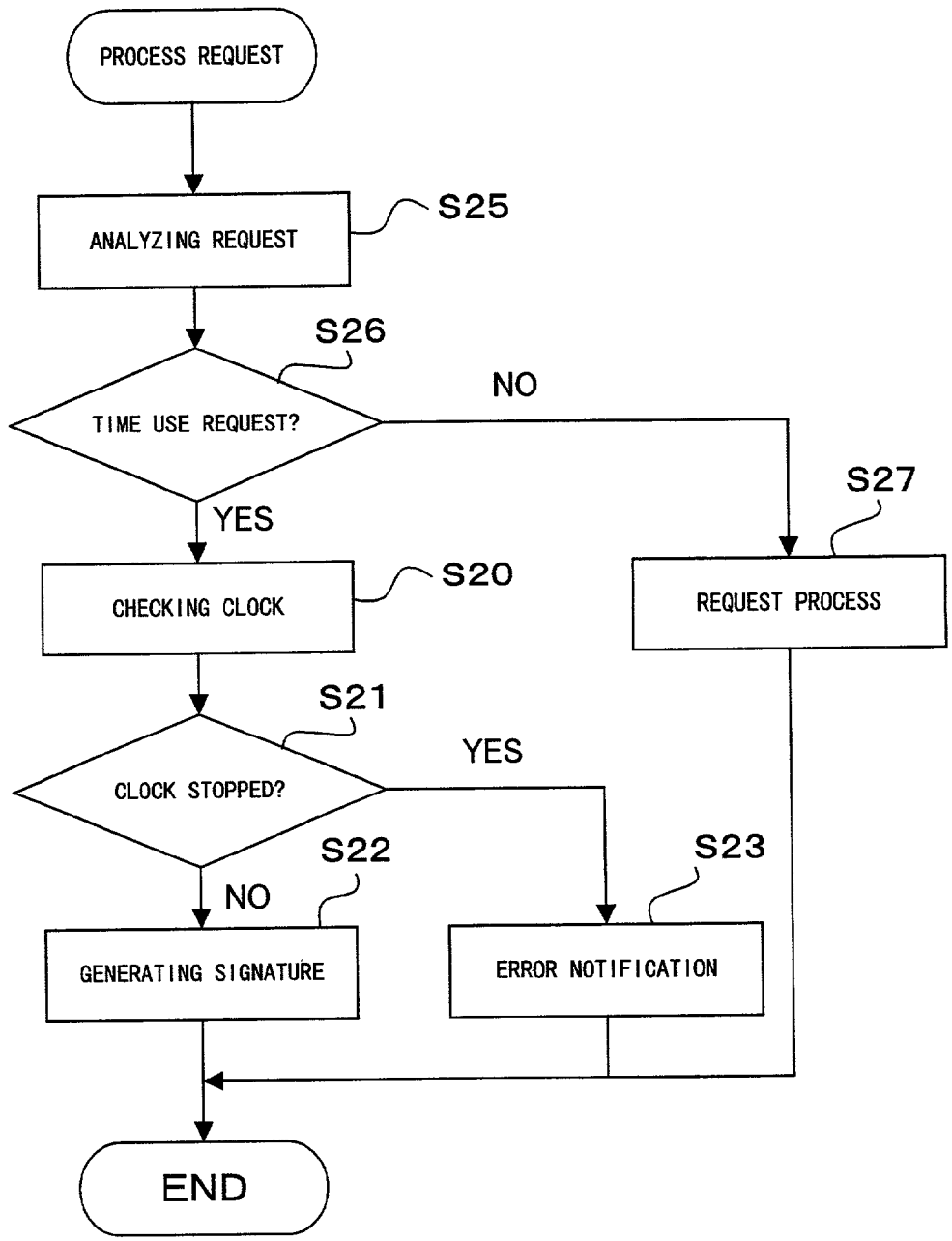
FIG. 13 shows another example of a flowchart of the process of the signature-with-time-stamp device.

FIG. 13 shows another example of a flowchart of the entire process of the signature-with-time-stamp device. In FIG. 13, the signature-with-time-stamp device performs processes not limited to the signature generating process as described by referring to FIG. 4, but also performs processes not requiring a time stamp such as a signature verifying process, a simple encrypting process for input data as described later, etc.

If the process starts in response to an external process request as shown in FIG. 13, the request is first analyzed in step S25, and it is determined in step S26 whether or not it is a request to use a correct time. If yes, the processes in steps S20 through S23 are performed as shown in FIG. 12. If the request relates to a process not requiring a correct time, the requested process is performed in step S27, thereby terminating the process.

FIG. 14 shows in detail the system of generating a signature in the signature-with-time-stamp device. In FIG. 14, a signature-with-time-stamp device 70 contains in the memory, in addition to the clock shown in FIG. 4, date-and-time setting frequency information 72, setter information 73, and a device ID 74 as an identifier of the device as described above by referring to FIG. 10.

As the date-and-time setting frequency information 72, the number of setting processes performed is stored as, for example, 8-byte binary data. As the setter information 73, for example, 8-byte data indicating the name or an ID of a setter, the I/O value as a flag if the number of setters is limited to two is stored. Furthermore, as the device ID 74, also 8-byte data is stored.

When data to be signed is externally input in FIG. 14, the date-and-time information (year, month, day, hour, minute, second) as an output of a clock 71, the date-and-time setting frequency information 72, the setter information 73, and the device ID 74 are linked 75 with the data to be signed, a signature is generated 77 using a signature key 76, and the setter information, the device ID, the date-and-time setting frequency information, the date-and-time information, and the signature are output externally. The output data other than the signature is output as, for example, non-encrypted data, that is, plaintext.

Figure 15:
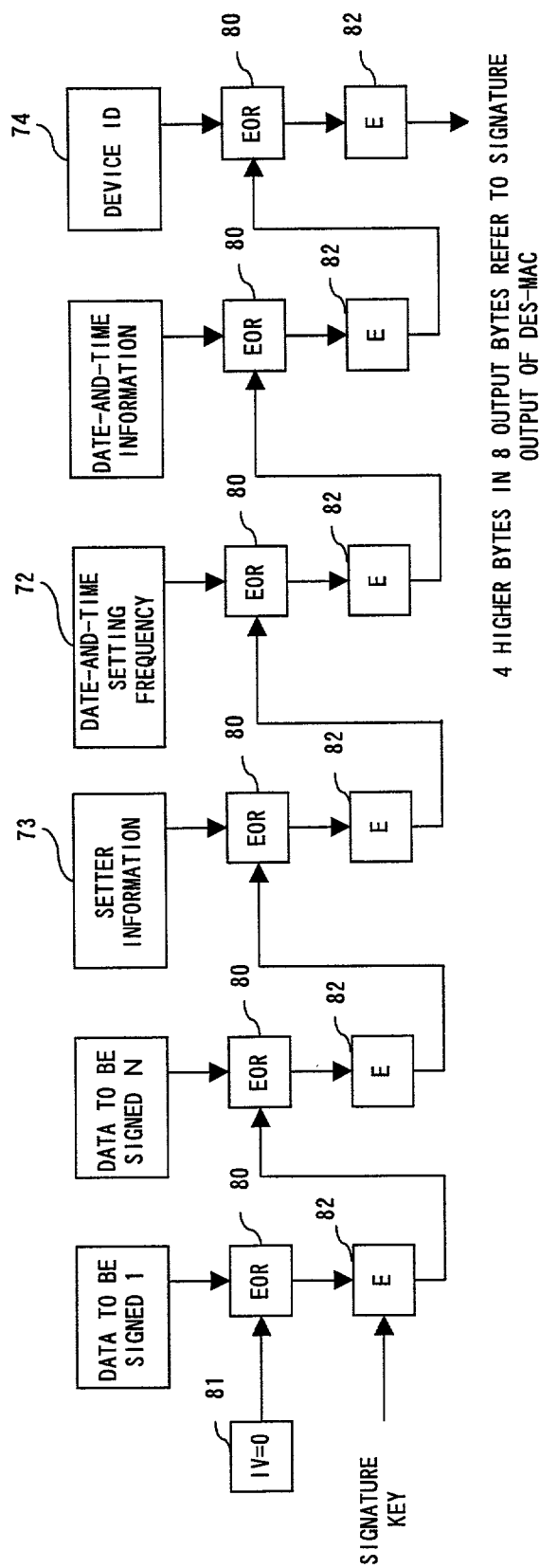
FIG. 15 shows the process of generating a signature in the DES-MAC system.

FIG. 15 shows the system of generating a signature according to an embodiment of the present invention. According to the present embodiment, a DES-MAC signature system is used in a CBC mode when a signature is generated. First, data to be signed is divided into 8-byte blocks to obtain data 1 through N to be signed.

In FIG. 15, an exclusive logical sum is obtained as EOR 80 for the data 1 to be signed with an initial value IV 81 set to 0, and then the output is encrypted 82 (encrypting process E82) using a signature key. The encryption result is input as one input data to the EOR 80 for the data 2 to be signed.

A similar operation is performed, that is, the EOR 80 and the encrypting process E 82 using a signature key are performed on the data N to be signed. The result is input to the EOR 80 to which the setter information 73 (8 bytes) is input, and the encrypting process E 82 is performed using a signature key.

Similarly, an operation is performed on the date-and-time setting frequency information 72, the date-and-time information, and the device ID 74, and a 8-byte final output is obtained. In the 8-byte output, the higher order 4 bytes (that is, 32 bits) are the result of the DES-MAC signature.

Figure 16:
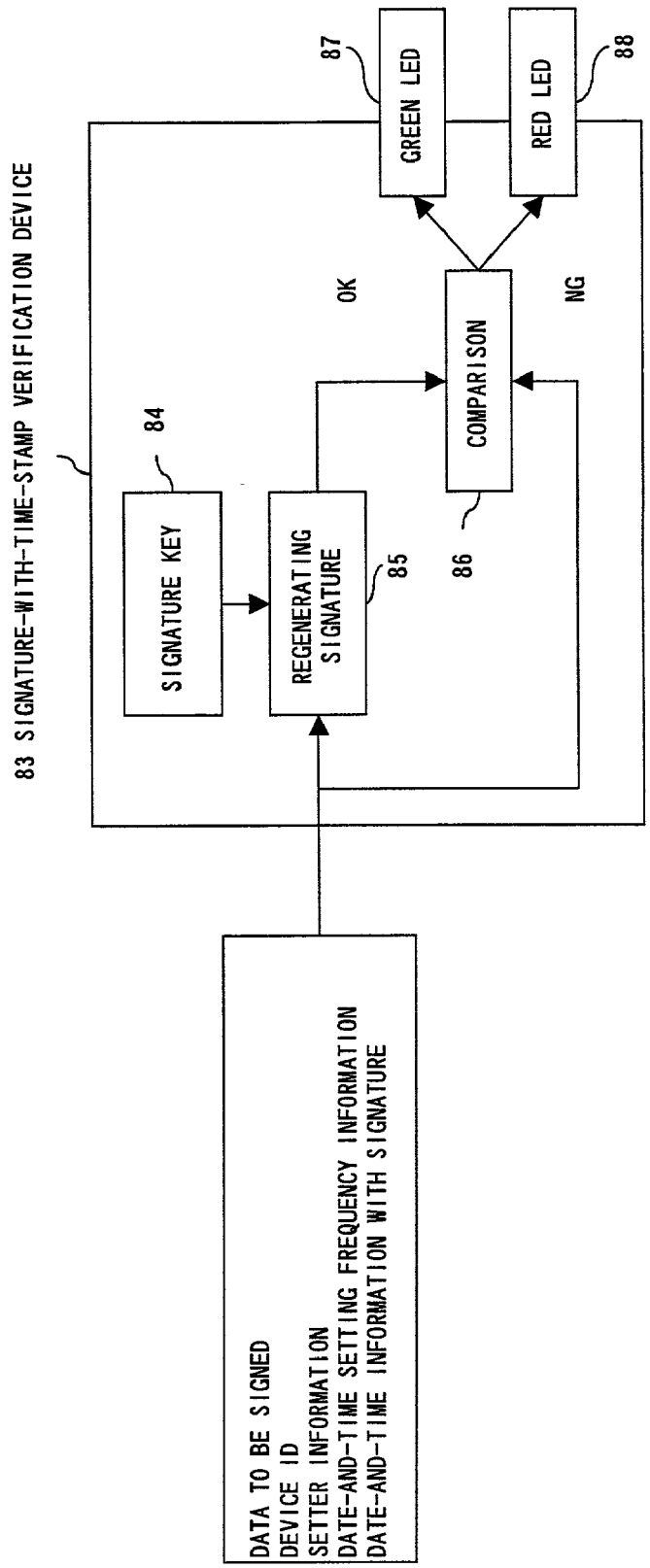
FIG. 16 shows the signature verification system.

FIG. 16 shows the system of verifying a signature in which the signature-with-time-stamp device not only generates a signature, but also verifies it as described above. In FIG. 16, for external signal verification, a signature is input together with data to be signed, a device ID, setter information, date-and-time setting frequency information, and date-and-time information.

In the signature-with-time-stamp verification device 83, a signature is regenerated 85 using the input data (excluding the signature) and a signature key 84, and the regenerated signature is compared 86 with the signature in the input data. If the signatures match each other, the signature is verified, and the notification that the signature is valid is displayed by turning ON, for example, a green LED 86.

If it is determined that the signature is illegal as a result of the comparison 86, a red LED 88 is turned ON to display that the signature is not acceptable. The display of the LED can be designed to be either automatically turned of after a predetermined time, or turned off by an external input.

Figure 17:
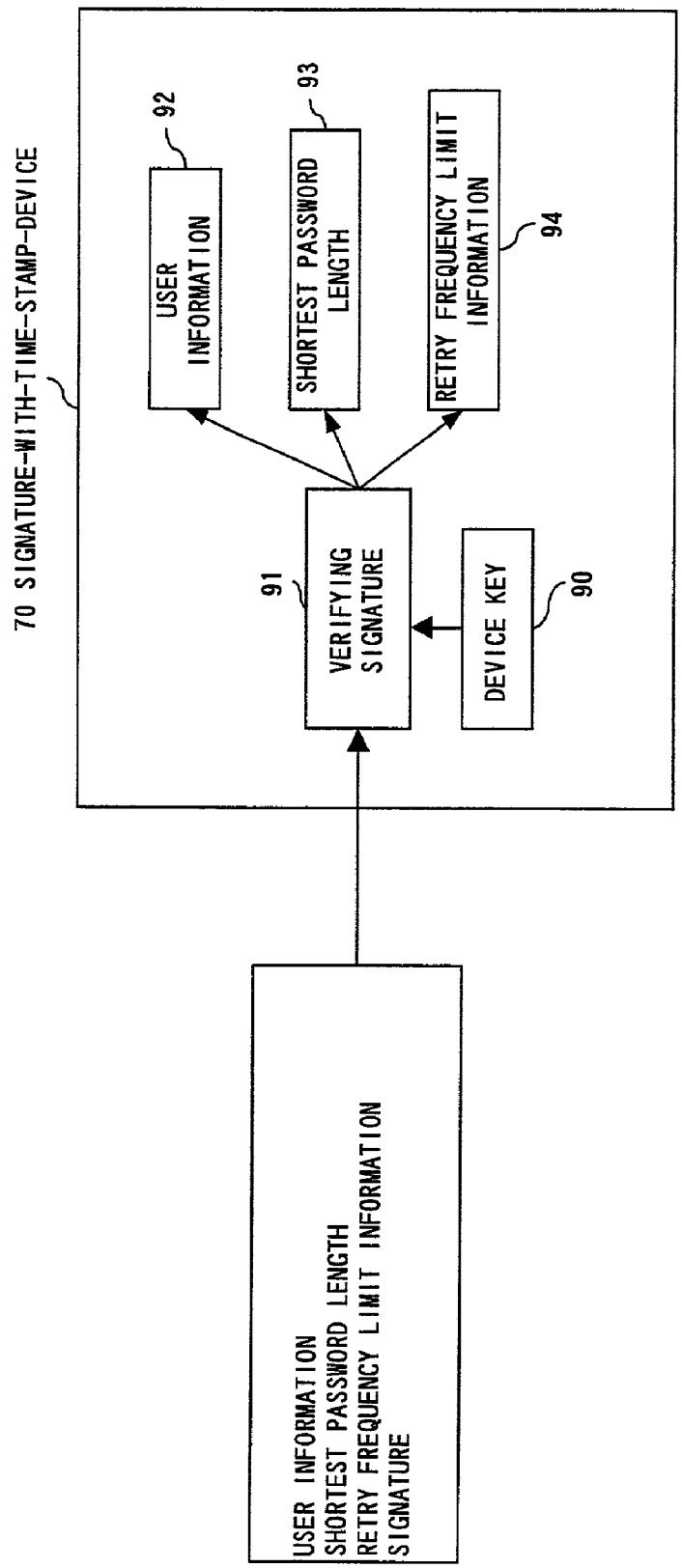
FIG. 17 shows the system of setting a password retry frequency and the shortest password length for the signature-with-time-stamp device.

FIG. 17 shows the system of setting the password retry frequency and the shortest password length. When a signature-with-time-stamp device is delivered, the password retry frequency and the shortest password length can be fixed values for the system. The fixed value for the retry frequency may not be limited, or the password length can be 1 character.

As described above by referring to FIG. 8, the manager on the user side initializes the signature-with-time-stamp device for a common user with the user registered, and the password retry frequency and the shortest password length appropriately set.

In FIG. 17, for example, the manager on the user side adds the signature to the user information, the shortest password length, and the retry frequency limit information, and provides them for the signature-with-time-stamp device 70.

The signature-with-time-stamp device 70 verifies 91 the signature using a device key 90 commonly used by the manager on the user side. If the result of the signature is acceptable, user information 92, a shortest password length 93, and retry frequency limit information 94 are stored in the memory. The user information can be data such as a user ID, etc. for use in authenticating a user, a signature key, etc.

The above mentioned device key 90 refers to a key used when various settings are output for a signature device, and a key unique for each device. Only a manager (management device) who (which) knows the unique key (that is, the device key 90) can determine the settings for a signature device.

Described below is a practical example of verifying 91 a signature. In the example, the signature is generated in the DES-MAC system. In this system, a signature is generated using a secret key for various setting messages, and is input to the device. The device which receives a signature verifies a signature using the same key. In the DES-MAC system, the same operation is performed in generating and verifying a signature. That is, when a signature is verified, a signature is generated in the same operation as the above mentioned operation in response to the message. Then, the generated signature is compared with the signature added to the message. If they match each other, the signature is recognized as an acceptable signature.

FIG. 18 is a flowchart of the password updating process according to the present embodiment. In FIG. 18, when the process starts in response to a password update instruction, the length of a password is detected in step S30, and the length is compared with the shortest password length in step S31. If it is equal to or longer than the shortest password length, the password is updated in step S32. If it is shorter than the shortest password length, then an error notification is issued in step S33, thereby terminating the process.

FIG. 19 is a flowchart of the password retry frequency limiting process. In FIG. 19, when a password is input and the process starts, it is first determined whether or not the password input in step S35 matches the password registered in the device. If yes, the retry frequency is satisfied in step S36, thereby terminating the process. If the retry frequency is lower the process in step S36 is not required.

If it is determined in step S35 that the passwords do not match each other, the current password retry frequency, that is, the password retry frequency up to the previous retry, is compared with the frequency limit information. If the frequency is lower than the frequency limit information, the retry frequency is incremented in step S38, thereby terminating the process. If the retry frequency up to the previous retry has already reached the frequency limit information, then the operation is stopped in step S39, thereby terminating the process. The retry frequency limit information indicates the retry frequency at which the operation of the device does not stop if the actual retry frequency has reached the information, but the operation stops if the actual retry frequency has exceeded the information.

Described finally is the process of loading a program onto a computer according to an embodiment of the present invention. The date-and-time management device and the signature-with-time-stamp device can be realized by a common computer.

Figure 20:
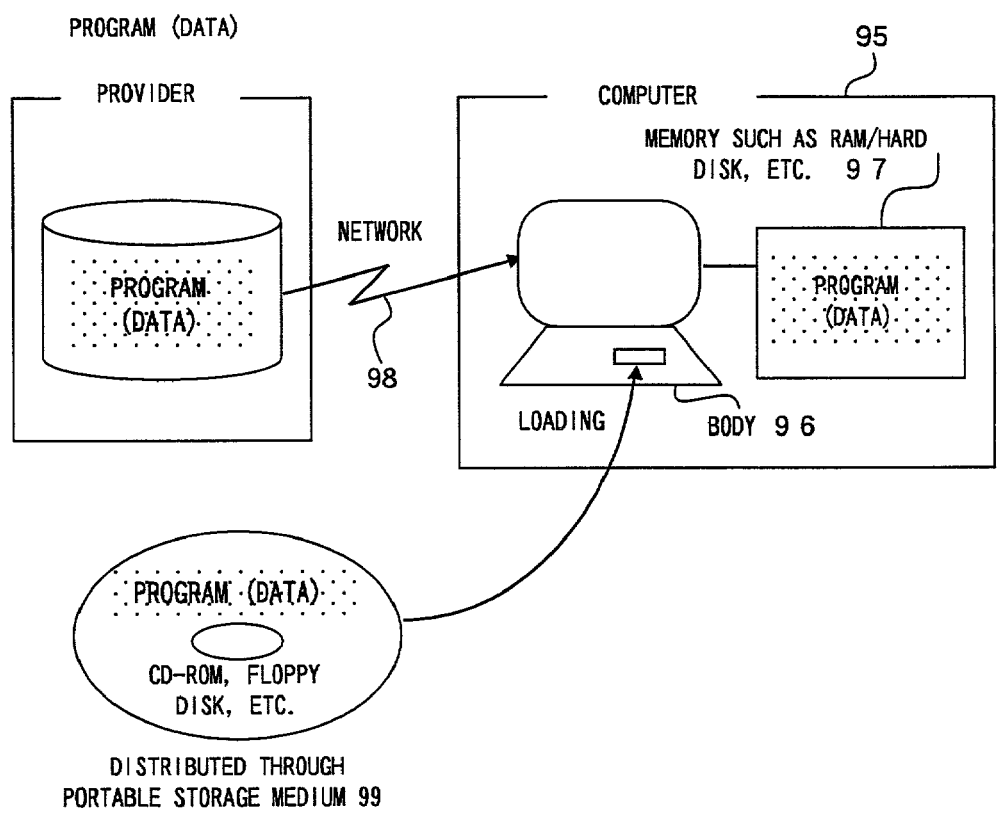
FIG. 20 shows the process of loading a program onto a computer according to an embodiment of the present invention.

FIG. 20 is a block diagram of the configuration of the computer. In FIG. 20, a computer 95 comprises a body 96 and memory 97. The memory 97 can be various storage devises such as random access memory (RAM), a hard disk, a magnetic disk, etc.

For example, the memory 97 stores the program, etc. shown in the flowcharts in FIGS. 6, 7, 12, 13, 18, and 19, etc. The program is executed by the body 96, thereby realizing an operation of the date-and-time management device and the signature-with-time-stamp device according to an embodiment of the present invention.

The above mentioned program is can be executed by loading onto the computer 95 through a network 98 from a program provider or by loading onto the computer 95 after storing the program in a marketed or distributed portable storage medium 99. The portable storage medium 99 can be various storage media such as a floppy disk, CD-ROM, an optical disk, a magneto-optical disk, etc. The program is stored in such storage media, and is executed by the computer 95, thereby realizing the operation of the date-and-time management device and the signature-with-time-stamp device.

FIG. 21 shows in detail the configuration of the hardware of the computer.

An information processing device 100 shown in FIG. 21 comprises a CPU 101, memory 102, an input device 103, a storage device 104, a medium drive device 105, and a network connection device 106. These units are connected through a bus 107. The configuration shown in FIG. 21 is an example, and the present invention is not limited to this configuration.

The CPU 101 is a central processing unit for controlling the entire information processing device 100.

The memory 102 can be RAM, etc. for temporarily storing a program or data stored in the storage device 104 (or a portable storage medium 108) when the program is executed, data is updated, etc. The CPU 101 performs the above mentioned various processes using the program/data read to the memory 102.

The input device 103 can be, for example, a keyboard, a pointing device, a touch panel, etc., and is used in inputting an instruction from a user and information.

The storage device 104 can be, for example, a magnetic disk device, optical device, a magneto-optical disk device, etc.

The medium drive device 105 reads a program/data stored in the portable storage medium 108. The portable storage medium 108 can be, for example, an FD (floppy disk), CD-ROM, a DVD, a magneto-optical disk, etc.

The above mentioned program/data can be obtained by downloading a program/data stored in an external device through a network connected by the network connection device 106. The present invention can be configured as a storage medium (the portable storage medium 108, etc.) storing the above mentioned program/data, as a network (transmission medium) for transmission of the program/data, and as a transmission signal transmitted through the transmission medium when the program/data is downloaded.

As described above, according to the present invention, for example, the function of managing a date-and-time in a valid range and applying a signature-with-time-stamp can be realized according to the purpose of a user. For a provider of a date-and-time management device and a signature-with-time-stamp device, it is not necessary to customize the settings for date-and-time information for each user. For example, the date-and-time information and the valid range of a signature can be freely changed on the user side by, for example, a manager on the user side. Furthermore, officially valid date-and-time management and a signature-with-time-stamp can be realized by the date-and-time information settings from an organization such as a national date-and-time management center, etc., thereby considerably improving the practical use of the date-and-time management device and the signature-with-time-stamp device.

What is claimed is:

1. A date-and-time management apparatus capable of inputting a date-and-time setting request from each of a plurality of date-and-time managers, comprising:
    a date-and-time setting request reception unit accepting a date-and-time setting request from any date-and-time manager before accepting a date-and-time setting request from a predetermined date-and-time manager, and accepting a date-and-time setting request only from the predetermined date-and-time manager, after accepting a date-and-time setting request from the predetermined date-and-time manager, wherein the date-and-time management apparatus is automatically configured to set a flag such; that a user of the date-and-time management apparatus is prevented from inputting the date-and-time setting request; and
    a clock unit functioning in response to the accepted date-and-time setting request.

2. The apparatus according to claim 1,
    further comprising a date-and-time management device for each date-and-time manager, and
    wherein said date-and-time management device for each date-and-time manager comprises a date-and-time setting request unit for issuing to said date-and-time setting request reception unit a copy request for a date-and-time managed by said device as the date-and-time setting request.

3. The apparatus according to claim 2, wherein said date-and-time setting request unit comprises a date-and-time copy data generation unit for generating data for a copy of the date-and-time using non-reproducible information received from the date-and-time setting request reception unit which accepted the date-and-time setting request and the date-and-time managed by said date-and-time management device that issued the date-and-time request.

4. The apparatus according to claim 3, wherein said date-and-time copy data generation unit encrypts the non-reproducible information and information about the managed date-and-time, and generates data for copy of the date-and-time.

5. The apparatus according to claim 3, wherein said date-and-time copy data generation unit generates a signature from a result of encrypting the non-reproducible information and the information about the managed date-and-time, and generates data for copy of a date-and-time by combining the non-reproducible information, the managed date-and-time, and the signature.

6. The apparatus according to claim 2, further comprising a further date-and-time management device of a deliverer having a date-and-time setting unit for setting a date-and-time for said date-and-time management device for each date-and-time manager when said date-and-time management device for each date-and-time manager is delivered.

7. The apparatus according to claim 1, further comprising a nonvolatile storage unit storing correction information for improving precision of said clock unit.

8. The apparatus according to claim 7, further comprising a correction information resetting unit for resetting the correction information stored in said nonvolatile storage unit in said clock unit when said clock unit becomes short of power, power is applied again to said unit, and said date-and-time setting request reception unit accepts a date-and-time setting request.

9. The apparatus according to claim 7, wherein a secondary battery is provided as a power source of said clock unit.

10. A date-and-time management apparatus capable of inputting a date-and-time setting request from each of a plurality of date-and-time managers in a hierarchical structure, comprising:
    a date-and-time setting request reception unit accepting a date-and-time setting request from any date-and-time manager in the plurality of date-and-time managers, and then accepting a date-and-time setting request only from a date-and-time manager at a higher hierarchical level than the date-and-time manager whose request has been accepted before; and
    a clock unit functioning in response to the accepted date-and-time setting request.

11. The apparatus according to claim 10,
    further comprising a date-and-time management device for each date-and-time manager, and
    wherein said date-and-time management device for each date-and-time manager comprises a date-and-time selling request unit for issuing to said date-and-time setting request reception unit a copy request for a date-and-time managed by said device as the date-and-time setting request.

12. The apparatus according to claim 11, wherein said date-and-time setting request unit comprises a date-and-time copy data generation unit for generating data for a copy of the date-and-time using non-reproducible information received from the date-and-time setting request reception unit which accepted the date-and-time selling request and the date-and-time managed by said date-and-time management device that issued the date-and-time request.

13. The apparatus according to claim 12, wherein said date-and-time copy data generation unit encrypts the non-reproducible information and the information about the managed date-and-time, and generates data for copy of the date-and-time.

14. The apparatus according to claim 12, wherein said date-and-time copy data generation unit generates a signature from a result of encrypting the non-reproducible information and the information about the managed date-andtime, and generates data for copy of a date-and-time by combining the non-reproducible information, the managed date-and-time, and the signature.

15. The apparatus according to claim 11, further comprising a further date-and-time management device of a deliverer having a date-and-time setting unit for selling a date-and-time for said date-and-time management device for each date-and-time manager when said date-and-time management device for each date-and-time manager is delivered.

16. The apparatus according to claim 10, further comprising a nonvolatile storage unit storing correction information for improving precision of said clock unit.

17. The apparatus according to claim 16, further comprising a correction information resetting unit for resetting the correction information stored in said nonvolatile storage unit in said clock unit when said clock unit becomes short of power, power is applied again to said unit, and said date-and-time setting request reception unit accept a date-and-time setting request.

18. The apparatus according to claim 16, wherein a secondary battery is provided as a power source of said clock unit.

19. A signature generation apparatus embedded with a date-and-time management function capable of inputting a date-and-time setting request from each of a plurality of date-and-time managers, comprising:
a date-and-time setting request reception unit accepting a date-and-time setting request from any date-and-time manager before accepting a date-and-time setting request from a predetermined date-and-time manager, and accepting a date-and-time setting request only from the predetermined date-and-time manager, after accepting a date-and-time setting request from the predetermined date-and-time manager, "wherein the signature generation apparatus is automatically configured to set a flag such"; that a user of the signature generation apparatus is prevented from inputting the date-and time setting request;
a clock unit functioning in response to the accepted date-and-time setting request; and
a signature generation unit generating a signature for input data to be signed according to information about a date-and-time indicated by said clock unit.

20. The apparatus according to claim 19, further comprising a signature stop unit stopping said signature generation unit generating a signature when an operation stop of said clock unit is detected.

21. The apparatus according to claim 20, further comprising a function execution unit executing a clock-started function, different than generating the signature, when the operation stop of said clock unit is detected.

22. The apparatus according to claim 19,
further comprising a date-and-time setter information storage unit storing information about a date-and-time manager as a date-and-time setter who has issued a date-and-time setting request last accepted by said date-and-time setting request reception unit,
wherein said signature generation unit generates a signature according to the information about the date-and-time setter in addition to the date-and-time information.

23. The apparatus according to claim 19,
further comprising a date-and-time setting frequency information storage unit storing a number of date-and-time setting requests ever accepted by said date-and-time setting request reception unit,
wherein said signature generation unit generates a signature according to the information about the date-and-time setting frequency information in addition to the date-and-time information.

24. A signature generation apparatus embedded with a date-and-time management function capable of inputting a date-and-time setting request from each of a plurality of date-and-time managers in a hierarchical structure, comprising:
a date-and-time setting request reception unit accepting a date-and-time setting request from any date-and-time manager in the plurality of date-and-time managers, and then accepting a date-and-time setting request only from a date-and-time manager at a higher hierarchical level than the date-and-time manager whose request has been accepted before;
a clock unit functioning in response to the accepted date-and-time setting request; and
a signature generation unit generating a signature for input data to be signed according to information about a date-and-time indicated by said clock unit.

25. The apparatus according to claim 24, further comprising a signature stop unit stopping said signature generation unit generating a signature when an operation stop of said clock unit is detected.

26. The apparatus according to claim 25, further comprising a function execution unit executing a clock-started function, different than generating the signature, when the operation stop of said clock unit is detected.

27. The apparatus according to claim 24,
further comprising a date-and-time setter information storage unit storing information about a date-and-time manager as a date-and-time setter who has issued a date-and-time setting request last accepted by said date-and-time setting request reception unit,
wherein said signature generation unit generates a signature according to the information about the date-and-time setter in addition to the date-and-time information.

28. The apparatus according to claim 24,
further comprising a date-and-time setting frequency information storage unit storing a number of date-and-time setting requests ever accepted by said date-and-time setting request reception unit,
wherein said signature generation unit generates a signature according to the information about the date-and-time setting frequency information in addition to the date-and-time information.

29. A date and time management system, comprising:
management devices, each including a setting request unit issuing a setting request for date and time; and
user devices, each including
a reception unit accepting an initial setting request from any management device before accepting a prioritized setting request from a specified management device, and accepting subsequent setting requests only from the specified management devices after accepting the prioritized setting request from the specified management device, "wherein the user devices are automatically configured to set a flag such"; that a user of the date-and-time management system is prevented from inputting the setting request; and
a clock unit setting the date and the time in response to each setting request accepted by said reception unit.

30. A date and time management system as recited in claim 29, wherein the specific management device is operated by a predetermined manager.

31. A date-and-time management apparatus capable of inputting a date-and-time setting request from each of a plurality of date-and-time manager servers, comprising:

a date-and-time setting request reception unit accepting a date-and-time setting request from any date-and-time manager server before accepting a date-and-time setting request from a predetermined date-and-time manager server, and accepting a date-and-time setting request only from the predetermined date-and-time manager server, after accepting a date-and-time setting request from the predetermined date-and-time manager server, so that a date-and-time setting state is changed automatically, "by setting a flag in the date-and-time management apparatus", without an operation by a user of the date-and-time apparatus; and a clock unit functioning in response to the accepted date-and-time setting request;

wherein a date-and-time setting authority of the predetermined date-and-time manager server cannot be changed after accepting the date-and-time setting request from the predetermined date-and-time manager server.

* * * * *

UNITED STATES PATENT AND TRADEMARK OFFICE
CERTIFICATE OF CORRECTION

PATENT NO.         : 7,272,720 B2
APPLICATION NO. : 09/805156
DATED                 : September 18, 2007
INVENTOR(S)       : Takayuki Hasebe et al.

It is certified that error appears in the above-identified patent and that said Letters Patent is hereby corrected as shown below:

Column 17, Line 44, change "such;" to --such--.

Column 18, Line 46-47, change "selling" to --setting--.

Column 18, Line 56, change "selling" to --setting--.

Column 19, Line 6, change "selling" to --setting--.

Column 19, Line 34, change ""wherein" to --wherein--.

Column 19, Line 36, change "such";" to --such--.

Column 19, Line 37, change "date-and time" to --date-and-time--.

Column 20, Line 56, change "devices" to --device,--.

Column 20, Line 58, change ""wherein" to --wherein--.

Column 20, Line 59, change "such";" to --such--.

Column 22, Line 1, change "automatically," to --automatically--.

Column 22, Line 1, change ""by" to --by--.

Column 22, Line 2, change "apparatus"," to --apparatus--.

Signed and Sealed this

Eighteenth Day of March, 2008

JON W. DUDAS
*Director of the United States Patent and Trademark Office*